United States Patent
Harashina

(10) Patent No.: US 6,753,363 B1
(45) Date of Patent: Jun. 22, 2004

(54) POLYACETAL RESIN COMPOSITION AND PROCESS FOR PRODUCTION THEREOF

(75) Inventor: Hatsuhiko Harashina, Fuji (JP)

(73) Assignee: Polyplastics Co., Ltd., Osaka (JP)

( * ) Notice: Subject to any disclaimer, the term of this patent is extended or adjusted under 35 U.S.C. 154(b) by 92 days.

(21) Appl. No.: 09/786,721

(22) PCT Filed: Jul. 14, 2000

(86) PCT No.: PCT/JP00/04778

§ 371 (c)(1),
(2), (4) Date: Mar. 8, 2001

(87) PCT Pub. No.: WO01/05888

PCT Pub. Date: Jan. 25, 2001

(30) Foreign Application Priority Data

Jul. 16, 1999 (JP) .......................................... 11-203932

(51) Int. Cl.[7] .......................... C08K 5/3432; C08K 5/31; C08K 5/521; C08K 3/02; C08K 5/5333

(52) U.S. Cl. ........................... 524/99; 524/99; 524/100; 524/127; 524/140; 524/147; 524/153; 524/414; 523/206; 523/207; 523/351

(58) Field of Search ........................ 524/99–100, 102, 524/127, 140, 145, 147, 153, 414, 143; 523/206–207, 351

(56) References Cited

U.S. PATENT DOCUMENTS

| | | | | |
|---|---|---|---|---|
| 3,485,793 A | | 12/1969 | Busse et al. ................. | 524/102 |
| 3,884,867 A | * | 5/1975 | Hilt et al. .................... | 523/200 |
| 3,951,908 A | * | 4/1976 | Kaiser et al. ................. | 524/99 |
| 4,230,606 A | * | 10/1980 | Amann et al. ................ | 524/46 |
| 4,242,240 A | * | 12/1980 | Cerny et al. .................. | 524/37 |
| 4,242,254 A | * | 12/1980 | Abolins ....................... | 523/209 |
| 5,036,120 A | * | 7/1991 | Orikasa et al. ............. | 523/436 |
| 5,236,988 A | * | 8/1993 | Doyama et al. ............. | 524/404 |
| 5,314,912 A | * | 5/1994 | Yoshitani et al. ........... | 524/458 |
| 5,965,639 A | * | 10/1999 | Yamauchi et al. ............ | 524/80 |
| 6,093,759 A | * | 7/2000 | Gareiss et al. .............. | 524/122 |
| 6,130,282 A | * | 10/2000 | Imahashi et al. ........... | 524/436 |

FOREIGN PATENT DOCUMENTS

| | | |
|---|---|---|
| JP | 43-22671 | 9/1968 |
| JP | 48-26840 | 4/1973 |
| JP | 48-43446 | 6/1973 |
| JP | 53-31899 | 9/1978 |
| JP | 54-85242 | 7/1979 |
| JP | 55-84348 | 6/1980 |
| JP | 55-35421 | 9/1980 |
| JP | 9-324105 | 12/1997 |

* cited by examiner

Primary Examiner—Peter Szekely
(74) Attorney, Agent, or Firm—Nixon & Vanderhye, PC

(57) ABSTRACT

A polyacetal resin composition of high flame retardancy and stability comprises a polyacetal resin, a flame retardant, and a basic nitrogen-containing compound (urea, amidine, aminotriazine, hydrazine, derivatives thereof, amide, urethane). The flame retardant may comprise an aromatic compound reactive to formaldehyde and a phosphorus-containing compound (e.g., red phosphorus, organic phosphonates, organic phosphinates, ammonium polyphosphate, and other phosphoric acid salts, phosphates), and the aromatic compound may be a hydroxyl group and/or amino group-containing compound or an aromatic ring-containing resin (e.g., novolak resins, aralkyl resins, vinylphenol resins, aniline resins, aromatic nylon resins, polycarbonate resins, polyarylate resins, aromatic epoxy resins, aromatic polyether resins). The ratio of the phosphorus-containing compound per 100 parts by weight of the aromatic compound is 1 to 500 parts by weight. The ratio of the flame retardant per 100 parts by weight of the polyacetal resin is 1 to 100 parts by weight, and the ratio of the nitrogen-containing compound is 0.01 to 80 parts by weight. The polyacetal resin may further comprise a drip inhibitor, an oxidation inhibitor, a heat stabilizer, a filler, an inorganic flame retardant, an inhibitor for inhibiting the formation of a phosphoric acid derivative, an impact resistance improver.

19 Claims, No Drawings

POLYACETAL RESIN COMPOSITION AND PROCESS FOR PRODUCTION THEREOF

TECHNICAL FIELD

The present invention relates to a polyacetal resin composition excellent in flame retardancy and moldability, a process for producing the same, and a shaped article molded therefrom.

BACKGROUND ART

Possessed of excellent mechanical properties, fatigue resistance, resistance to friction and wear, resistance to chemicals, and moldability, the polyacetal resin has found application in a variety of fields such as automotive parts, electrical and electronic parts, other precision machine parts, architectural members and pipeline components, household and cosmetic parts, and medical device parts. However, with the increasing scope and diversification of uses, the resin is required to satisfy more and more sophisticated requirements. For example, the polyacetal resin is small in oxygen index but high in combustibility (flame retardancy), so that it is extremely difficult to render the resin flame-retardant. Accordingly, the application of the polyacetal resin is largely limited.

There have been made many proposals for the way to render the polyacetal resin flame-retardant. For example, Japanese Patent Application Laid-Open No. 43446/1973 (JP-48-43446A) discloses a flame-retardant resin composition formed by adding a nitrate with Mn, Ba, Sr, Ca, or Mg to an oxymethylene polymer. Japanese Patent Publication No. 35421/1980 (JP-55-35421B) discloses a flame-retardant polyoxymethylene composition formed by adding at least one triazine-based flame retardant selected from melamine, guanamine, melam, ammelide, ammeline, and derivatives thereof (e.g., methylol, alkyl, or aryl derivatives), dicyandiamide and its methylol derivatives, to polyoxymethylene. This publication also discloses a polyoxymethylene composition further comprising at least one flame retardant (source of phosphoric acid) selected from phospham, phosphamide, and phosphorus imide. Japanese Patent Application Laid-Open No. 85242/1979 (JP-54-85242A) discloses a flame-retardant resin composition comprising a polyacetal resin and melamine cyanurate. In the specification of U.S. Pat. No. 3,485,793 is disclosed a flame-retardant resin composition constituted of a polyoxymethylene resin, 5 to 30% by weight of a compound selected from amines, ammonium phosphate and amidine phosphate and, if necessary, 1 to 20% by weight of a formaldehyde trapping agent.

Japanese Patent Application Laid-Open No. 324105/1997 (JP-9-324105A) discloses a resin composition comprising a polyoxymethylene resin and a flame retardant constituted of ammonium polyphosphate alone or a combination of ammonium polyphosphate and a melamine compound, in which the volume average particle size of the ammonium polyphosphate is 30 μm or less. Japanese Patent Publication No. 22671/1968 (JP-43-22671B) discloses a flame-retardant oxymethylene polymer composition containing an oxymethylene polymer, monoammonium phosphate, biammonium phosphate, and a mixture thereof.

However, even with any of the flame retardants recited in these publications, it is still impossible to render a polyacetal resin of low oxygen index flame-retardant to a satisfactory level.

Japanese Patent Application Laid-Open No. 26840/1973 (JP-48-26840A) discloses a self-extinguishable mold material comprising, as a base, polyoxymethylene containing 5 to 15% by weight of fine red phosphorus adjusted to neutral or basic and 1 to 40% by weight of glass fibers. Japanese Patent Application Laid-Open No. 31899/1978 (JP-53-31899A) discloses a flame-retardant polyoxymethylene composition containing, relative to polyoxymethylene, a blend of red phosphorus and a triazine compound, guanidlne, cyanoguanidine, or its derivative (e.g., a phosphate, a condensed phosphate, methylol derivative). Japanese Patent Application Laid-Open No. 84348/1980 (JP-55-84348A) discloses a flame-retardant acetal resin composition formed by incorporating a molybdenum compound and red phosphorus or a phosphorus-containing compound to an acetal resin.

However, even with the use of any of the red phosphorus-based flame retardant recited in these publications, it is still difficult to make the polyacetal resin flame-retardant to a satisfactory level. Particularly, since the polyacetal resin does not become flame-retardant if the amount of the flame retardant is small, the inherent characteristics of the polyacetal resin are largely degraded.

Accordingly, an object of the present invention is to provide a polyacetal resin composition of high flame retardancy and stability, a process for producing the same, and a shaped article made therefrom.

Another object of the present invention is to provide a resin composition the addition of a small amount of which to a polyacetal resin renders high flame retardancy and stability thereto, a process for producing the same, and a shaped article formed therefrom.

Still another object of the present invention is to provide a polyacetal resin composition with improved heat stability (or melt-stability upon molding), a process for producing the same, and a shaped article formed therefrom.

DISCLOSURE OF INVENTION

The inventors of the present invention made intensive studies on the flame retardation and stabilization of a polyacetal resin to achieve the objects mentioned above, and finally found that it is possible to impart high flame retardancy and stability to a polyacetal resin by constituting a flame retardant with a phosphorus-containing compound and a specific aromatic compound and using the resulting flame retardant in combination with a basic nitrogen-containing compound, albeit the amount of the flame retardant to be added is small. The present invention was accomplished based on the above finding.

That is, the resin composition of the present invention comprises a polyacetal resin, a flame retardant, and a basic nitrogen-containing compound, wherein the flame retardant comprises a phosphorus-containing compound and an aromatic compound which in association with the phosphorus-containing compound accelerates the flame-retardation. The phosphorus-containing compound includes red phosphorus, (poly)phosphates, phosphoric acid esters, organic phosphonates, and organic phosphinates. Exemplified as the aromatic compound are compounds having a hydrocarbon ring reactive to formaldehyde or their derivatives (e.g., hydroxyl and/or amino group-containing phenolic compounds, or their derivatives), and the aromatic compound may be an aromatic ring-containing resin. As the basic nitrogen-containing compound, urea and derivative thereof, amidine derivatives, aminotriazine and derivatives thereof, pyrimidine and derivatives thereof, hydrazine and derivatives thereof, amide-series compounds, and urethane-series compounds are available. The resin composition may further contain a dripping inhibitor, an antioxidant, a filler, an inorganic flame retardant, an inhibitor for inhibiting the formation of a phosphoric acid derivative, an impact resistance improver, and others.

The present invention includes a process for producing a flame-retardant polyacetal resin composition by mixing a polyacetal resin, the above-described flame retardant, and a basic nitrogen-containing compound together, and a shaped article formed from the polyacetal resin composition.

BEST MODE FOR CARRYING OUT THE INVENTION

[Polyacetal Resin]

The polyacetal resin is a macromolecular compound containing the oxymethylene group (—CH$_2$O—) as a predominant constituent unit and includes polyacetal homopolymers or polyoxymethylene (e.g., "Derlin" manufactured by DuPont, U.S.A; "Tenac 4010" manufactured by Asahi Chemical Industry Co., Ltd.; etc.) and polyacetal copolymers comprising the oxymethylene unit and a comonomer unit (e.g., "Duracon" manufactured by Polyplastics Co., Ltd.). Referring to such copolymers, the comonomer unit includes oxyalkylene units having 2 to 6 carbon atoms (preferably about 2 to 4 carbon atoms) (e.g., oxyethylene (—CH$_2$CH$_2$O—), oxypropylene, and oxytetramethylene units). The proportion of such comonomer unit may be small and can be selected within the range of about 0.01 to 20 mol %, preferably about 0.03 to 10 mol % (e.g., 0.05 to 5 mol %), more preferably about 0.1 to 5 mol %, relative to the whole polyacetal resin.

The polyacetal copolymer may for example be a two-component copolymer, a terpolymer and so on. The polyacetal copolymer may also be a random copolymer, a block copolymer (e.g., Japanese Patent Publication No. 24307/1990 (JP-2-24307B), manufactured by Asahi Chemical Industry, Co., Ltd., Tenac LA, Tenac LM), or a graft copolymer. Moreover, the polyacetal resin may be linear or branched, and may have a crosslinked structure. In addition, the end groups of the polyacetal resin may have been stabilized by esterification with a carboxylic acid such as acetic acid, propionic acid, or its anhydride, urethanization with an isocyanate compound, or etherification. There is no particular limitation on the degree of polymerization, the degree of branching, or the degree of crosslinking, only provided it can be melt-molded. There is no particular restriction as to the molecular weight of the polyacetal resin, and the weight average molecular weight is about 5,000 to 500,000, preferably about 10,000 to 400,000.

The polyacetal resin can be produced by polymerizing an aldehyde such as formaldehyde, paraformaldehyde, and acetaldehyde; trioxane; or a cyclic ether or cyclic formal such as ethylene oxide, propylene oxide, butylene oxide, styrene oxide, cyclohexene oxide, 1,3-dioxorane, diethylene glycol formal, and 1,4-butanediol formal. Further, as the copolymerizable component, an alkyl or arylglycidyl ether (e.g., methylglycidyl ether, ethylglycidyl ether, phenylglycidyl ether, naphthylglycidyl ether), an alkylene or polyoxyalkylene glycol diglycidyl ether (e.g., ethylene glycol diglycidyl ether, triethylene glycol diglycidyl ether, butanediol diglycidyl ether), an alkyl or aryl glycidyl alcohol, a cyclic ester (e.g., β-propiolactone), or a vinyl compound (e.g., styrene, vinyl ether) can be employed.

[Flame Retardant]

The first characteristic of the present invention is to constitute a flame retardant with a phosphorus-containing compound and a specific aromatic compound and add the resulting flame retardant to a polyacetal resin to impart high flame retardancy and self-extinguishable properties thereto. The use of such flame retardant makes it possible to impart, though being small in amount, high flame retardancy or self-extinguishable properties to the polyacetal resin, so that the characteristics of the polyacetal resin are not adversely affected.

[Phosphorus-containing Compound]

As the phosphorus-containing compound, there are mentioned organophosphorus compounds (e.g., monomer-type organophosphorus compounds, polymer-type organophosphorus compounds) and inorganic phosphorus compounds. These phosphorus-containing compounds can be used either singly or in combination.

Of the organophosphorus compounds mentioned above, the monomer-type organophosphorus compounds include phosphates, phosphites, phosphines (e.g., triphenyl phosphine, tricresyl phosphine), and phosphine oxides (triphenyl phosphine oxide, tricresyl phosphine oxide). Examples of the phosphates are aliphatic phosphates [e.g., triC$_{1-10}$alkyl phosphates such as triethyl phosphate, tributyl phosphate, pentaerythritol phosphate (e.g., "Great Lakes NH-1197" manufactured by Great Lakes Chemical), and truisobutyl phosphate; diC$_{1-10}$alkyl phosphates such as diethyl phosphate, dibutyl phosphate, and di(2-ethylhexyl) phosphate; monoC$_{1-10}$alkyl phosphates], aromatic phosphates [e.g., triC$_{6-20}$aryl phosphates such as triphenyl phosphate, tricresyl phosphate, and trixylyl phosphate], and aliphatic-aromatic phosphates (e.g., methyl diphenyl phosphate, phenyl diethyl phosphate).

Examples of the phosphites correspond to the phosphates enumerated above, including aromatic phosphites (triC$_{6-20}$aryl phosphites); aliphatic phosphites (e.g., triC$_{1-10}$alkyl phosphites; diC$_{1-10}$alkyl phosphites; monoC$_{1-10}$alkyl phosphites), aliphatic-aliphatic phosphites [e.g., alkyl phosphonic acid alkyl esters (e.g., "Antiblaze 1045" manufactured by Albright & Wilson)] and aliphatic-aromatic phosphites (e.g., alkyl phosphonic acid aryl esters).

Moreover, the monomer-type organophosphorus compounds include hypophosphites which may be substituted by an alkyl group and/or an aryl group (e.g., 9,10-dihydro-9-oxa-10-phosphaphenanthrene-10-oxide), phosphonocarboxylates, and nitrogen-containing phosphates (e.g., phosphoric acid ester amide "SP-703" manufactured by Shikoku Corp.).

The monomer-type organophosphorus compounds include ammonium salts of acidic aliphatic phosphates (e.g., pentaerythritol diphosphate) and salts of amine-containing compounds (e.g., guanidine salts, melamine salts, melam salts, melem salts, mellon salts).

As the polymer-type organophosphorus compounds, condensates of the aforementioned monomer-type organophosphorus compounds are available. The condensates may have a repeating unit represented by the following formula (1):

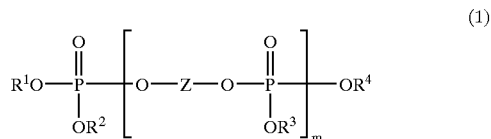

(1)

wherein each of the groups $R^1$ to $R^4$ represents an aryl group, Z represents a divalent aromatic group, and m denotes an integer of from 1 to 5.

In the formula (1), the aryl groups represented by $R^1$ to $R^4$ are for example C$_{6-20}$ aryl groups such as phenyl and naphthyl groups, and exemplified as the substituent of the aryl group are alkyl groups such as methyl and ethyl groups. Moreover, examples of the divalent aromatic group are arylene groups (e.g., $C_{6-20}$ arylene groups such as phenylene and naphthylene groups), biphenylene group, and bisphenol residues (e.g., bisphenol-A residue, bisphenol-S residue).

Examples of the condensate represented by the above-shown formula (1) are resorcinol phosphates [e.g., resorcinol bis(diphenyl phosphate), resorcinol bis(dicresyl phosphate), resorcinol bis(dixylenyl phosphate)], hydroquinone phosphates [e.g., hydroquinone bis(diphenyl phosphate), hydroquinone bis(dicresyl phosphate), hydroquinone bis(dixylenyl phosphate)], biphenol phosphates [e.g., biphenol bis(diphenyl phosphate), biphenol bis(dicresyl phosphate), biphenol bis(dixylenyl phosphate), and bisphenol phosphates [e.g., bisphenol-A phosphates such as bisphenol-A bis(diphenyl phosphate), bisphenol-A bis(dicresyl phosphate), and bisphenol-A bis(dixylenyl phosphate); bisphenol-S phosphates such as bisphenol-S bis(diphenyl phosphate), bisphenol-S bis(dicresyl phosphate), bisphenol-S bis(dixylenyl phosphate)].

The polymer-type organophosphorus compounds may be phosphates of polymers having a hydroxyl group (e.g., phenolic resin), for examples polymers having a constitutional unit represented by the following formula (2):

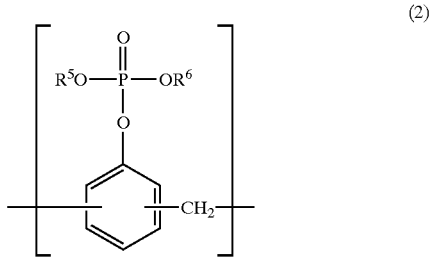

(2)

wherein each of the groups $R^5$ and $R^6$ represents an aryl group which may have a substituent.

Exemplified as the aryl group are $C_{6-20}$ aryl groups (particularly, phenyl group). Examples of the substituted aryl group are $C_{1-4}$ alkyl-substituted phenyl groups, such as methylphenyl group, dimethylphenyl group, and others.

Further, the polymer-type organophosphorus compounds include polyphosphinico-carboxylates, polyphosphonic acid amides, and phosphazene compounds (e.g., phenoxyphosphazene oligomer).

Examples of the polyphosphonic acid amides are polymers having a constitutional unit represented by the following formula (3):

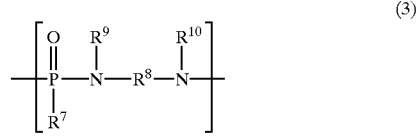

(3)

wherein $R^7$ represents an alkyl, cycloalkyl, aryl, or aralkyl group, $R^8$ represents an alkylene, arylene, or aralkylene group, $R^9$ and $R^{10}$ are the same or different, each representing a hydrogen atom, an alkyl group, or an aryl group, and $R^9$ and $R^{10}$ may be bound together to form a ring.

The inorganic phosphorus compounds include red phosphorus and phosphates. Phosphoric acid includes orthophosphoric acid, phosphorous acid, polyphosphoric acids (e.g., metaphosphoric acid, pyrophosphoric acid), and polyphosphorous acids (e.g., metaphosphorous acid, pyrophosphorous acid). The salts thereof include alkaline metal salts (e.g., lithium salts, sodium salts, potassium salts), alkaline earth metal salts (e.g., magnesium salts, calcium salts), salts with the metals of the Group 3B of the Periodic Table of Elements (e.g., aluminum salts), and ammonium salts. The salts listed above further include amine salts, such as guanidine salts and salts of triazine-series compounds (e.g., melamine salts, melam salts, melem salts, mellon salts).

Incidentally, the organophosphorus compounds and inorganic phosphorus compounds include salts of organic phosphoric acid or inorganic phosphoric acid with metals (e.g., Ca, Mg, Zn, Ba, or Al salts) or with amine-containing compounds (e.g., ammonium salts, guanidine salts, guanamine salts, melamine salts, melam salts, melem salts, mellon salts). Examples of the organic phosphorus or inorganic phosphorus are phosphorous acid which may be substituted with an alkyl group and/or an aryl group (e.g., alkyl phosphonates such as methyl phosphonate; aryl phosphonates such as phenyl phosphonates, and 10-hydroxy-9,10-dihydro-9-oxa-10-phosphaphenanthrene-10-oxide; 1-hydroxyethylidene-1,1'-diphosphonic acid, ni-trilotris (methylene)phosphonate), hypophosphorous acids (e.g., dialkyl phosphinates such as methyl ethyl phosphinate, diethyl phosphinate, ethyl butyl phosphinate, dibutyl phosphinate, ethane-1,2-di(methyl phosphinate); alkyl aryl phosphinates such as methyl phenyl phosphinate; 1-hydroxydihydrophosphonyl oxide, 1-hydroxyphosphorane oxide), phosphonocarboxylic acids (e.g., phosphonoacetate, 3-phosphono-propionate), phosphinicocarboxylic acids [e.g., 3-methylphosphonico-propionate (2-carboxy ethyl methyl phosphinate), 3-phenylphosphinico-propinate], acids such as nitrogen-containing phosphoric acid, and esters thereof. For example, metal salts of organophosphorus compounds or amine-containing compound salts can be prepared referring to, for example, Japanese Patent Application Laid-Open No. 63848/1976 (JP-51-63848A), Japanese Patent Application Laid-Open No. 5979/1980 (JP-55-5979A), Japanese Patent Application Laid-Open No. 124792/1980 (JP-55-124792A), Japanese Patent Application Laid-Open No. 104949, Japanese Patent Application Laid-Open No. 22866/1988 (JP-63-22866A), Japanese Patent Application Laid-Open No. 226891/1989 (JP-1-226891A). Japanese Patent Application Laid-Open No. 4-234893/1992 (JP-4-234893A), Japanese Patent Application Laid-Open. No. 73720/1996 (JP-8-73720A), and Japanese Patent Application Laid-Open No. 140228/1999 (JP-11-140228A).

Preferred phosphates are salts of polyphosphoric acid, particularly ammonium polyphosphate; salts of polyphosphoric acid with at least one member selected from melamine and melamine condensates (e.g., melamine polyphosphates, melam polyphosphate, melem polyphosphate, melamine/melam/melem complex polyphosphate); and polyphosphoric acid amides (e.g., ammonium polyphosphate modified with an amino group-containing triazine or guanidine).

Preferred phosphorus-containing compounds include phosphoric acid esters (e.g., aliphatic phosphates, aromatic phosphates), organic phosphonates (e.g., organic phosphonic acid metal salts), organic phosphinates (e.g., organic phosphinic acid metal salts), and inorganic phosphorus compounds (e.g., (poly)phosphates such as ammonium polyphosphate, red phosphorus), with red phosphorus and ammonium polyphosphate particularly preferred.

Since red phosphorus has high flame retardation effects and takes effect in a small amount, it is possible to impart flame-retardant properties without adversely affecting the characteristics (e.g., mechanical properties, electrical properties) of the resin to be flame-retarded. As the red phosphorus, usually, red phosphorus which underwent stabilization treatment, that is, stabilized red phosphorus, is preferably employed. Particularly preferred are red phosphorus which has been finely divided without pulverization so as not to make the surface highly reactive to water or oxygen, and red phosphorus the surface of which is coated with one member or a combination of two or more members selected from resins (e.g., thermosetting resins, thermoplastic resins), metals, metal compounds (e.g., metal hydroxides, metal oxides).

Exemplified as the thermosetting resins are phenolic resin, melamine-based resins, urea-based resins, alkyd resin, unsaturated polyester-series resin, and silicone-series resin, and examples of the thermoplastic resins are polyester-series resins, polyamide-series resins, acrylic resins, olefinic resins, and others. Examples of the metal hydroxides are aluminum hydroxide, magnesium hydroxide, zinc oxide, titanium oxide, zirconium oxide, copper oxide, iron oxide, molybdenum oxide, tungsten oxide, and tin oxide.

The surface of the red phosphorus is coated with metal (e.g., iron, nickel, copper, aluminum, zinc, manganese, tin, titanium, zirconium) or an alloy thereof for stabilization thereof though electroless plating. Other processes for coating the surface of red phosphorus include a process in which red phosphorus is treated with a metal salt (e.g., a salt with aluminum, magnesium, zinc, titanium, copper, silver, iron, nickel) to form a metal phosphorus compound on the red phosphorus surface.

Particularly preferred is red phosphorus which has been coated with a plurality of layers being a combination of a layer(s) of a metal component(s) (e.g., metal hydroxide, metal oxide) and a resin layer(s), particularly with a metal component layer covered by a plurality of resin layers. Such red phosphorus is excellent in heat stability and hydrolysis resistance and the amount of a phosphine they produce upon decomposition in the presence of moisture or under high temperatures is so extremely small that they are preferable from the viewpoint of safety in the course of producing the resin composition of the present invention and a shaped article molded therefrom.

Such stabilized red phosphorus can be prepared referring to Japanese Patent Application Laid-Open No. 169120/2000 (JP-2000-169120A), Japanese Patent Application Laid-Open No. 67467/1997 (JP-9-67467A), Japanese Patent 115914/1994 (JP-6-1.15914A), Japanese Patent Application Laid-Open No. 229806/1993 (JP-5-229806/1993), Japanese Patent Application Laid-Open No. 2599956/1991 (JP-3-259956A). Japanese Patent Application Laid-Open No. 209991/1990 (JP-2-209991A), Japanese Patent Application Laid-Open No. 150309/1989 (JP-1-150309A), Japanese Patent Application Laid-Open No. 21704/1987 (JP-62-21704A), Japanese Patent Application Laid-Open No. 125489/1977 (JP-52-125489A), EP 296501A1, and EP249723/A2.

As the red phosphorus, usually a stabilized one in the form of particles can be employed. The mean particle size of the stabilized red phosphorus is for example about 0.01 to 100 $\mu$m, preferably about 0.1 to 50 $\mu$m, more preferably about 0.1 to 30 $\mu$m. Moreover, particulate (e.g., microfine spheres) stabilized red phosphorus having a mean particle size of 0.01 to 5 $\mu$m may for example be employed.

Furthermore, the stabilized red phosphorus may be one treated with a surface modifier such as an epoxy-series compound, a silane-series compound, a titanate-series compound, and a chrominum-series compound.

The stabilized phosphoruses described above may be used either singly or in combination. For example, red phosphoruses with different coatings, those having different particles sizes, and other phosphorus-containing compounds other than red phosphorus can be used as an arbitrary selected combination.

As the ammonium polyphosphate, a conventional one can be used. Particularly, the use of ammonium polyphosphate coated with a resin is preferred, for it has improved water resistance.

The phosphorus-containing compound constituting the resin composition of the present invention may be composed of the above-described stabilized red phosphorus and a thermoplastic resin. The phosphorus-containing compound may be constituted of a thermoplastic resin containing a stabilized red phosphorus (e.g., a stabilized red phosphorus-containing master batch composed of a stabilized red phosphorus and a thermoplastic resin). The use of a thermoplastic resin not only improves the ease of handling of a stabilized red phosphorus but prevents the stability of the resulting composition from deteriorating due to red phosphorus. Examples of the thermoplastic resin are olefinic resins, polyurethane-series resins, polyamide-series resins, polyalkylene oxide-series resins (e.g., homo- or copolymers of polyethylene oxide, polypropylene oxide, and polytetramethylene oxide, and their modified products), acrylic resins, styrenic resins, polyester-series resins, polycarbonate-series resins, phenoxy-series resins, polyarylate-series resins, polyphenylene oxide-series resins, polyphenylene sulfide-series resins, polysulfone-series resins, polyethersulfone-series resins, polyether ketone-series resins, polyether nitrile-series resins, polyimide-series resins, silicon-series resins, fluorine-containing resins, and others. These thermoplastic resins can be employed either singly or in combination. Preferred thermoplastic resins include olefinic resins, polyurethane-series resins, polyamide-series resins, polyalkylene oxide-series resins, acrylic resins, styrenic resins, and polyester-series resins.

As the olefinic resins, there are mentioned homopolymers of ethylene, propylene, 1-butene, 1-pentene, isobutene, butadiene, isoprene, phenylpropadiene, cyclopentadiene, norbornadiene, cyclohexadiene, cyclohexadiene, and cyclooctadiene (e.g., low-density polyethylene, high-density polyethylene, linear low-density polyethylene, isotactic polypropylene, syndiotactic polypropylene, atactic polypropylene), ethylene-vinyl acetate copolymer, olefine-alkyl (meth)acrylate copolymers [e.g., ethylene-alkyl (meth)acrylate copolymer, propylene-alkyl (meth)acrylate copolymer, 1-butene-alkyl (meth)acrylate copolymer], olefine-(meth)acrylate copolymers [e.g., ethylene-(meth)acrylate copolymer, propylene-(meth)acrylate co-polymer], olefine-(meth)acrylic acid metal salt copolymers that is, ionomers, such as metal salts of ethylene-(meth)acrylate (e.g., metal salts with Na, K, Mg, Ca, Zn), ethylene-$\alpha$-olefine copolymers (e.g., ethylene-propylene copolymers), olefine-carbon monoxide copolymers (e.g., ethylene-carbon monoxide copolymer, ethylene-propylene-carbon monoxide copolymer), olefine-carbon monoxide-alkyl (meth)acrylate ternary copolymers [e.g., ethylene-carbon monoxide-alkyl (meth)acrylate copolymer, propylene-carbon monoxide-alkyl (meth)acrylate copolymer], olefinic resins modified with other vinyl monomers copolymerizable with the above-mentioned (co)polymers, and polyethylene waxes.

In the modified olefinic resins, examples of other copolymerizable vinyl monomers are aromatic vinyl compounds (e.g., styrene, vinyltoluene, $\alpha$-methylstyrene, divinylbenzene), glycidyl (meth)acrylates (e.g., glycidyl acrylate, glycidyl methacrylate), unsaturated nitrile compounds (e.g., acrylonitrile, methacrylonitrile), unsaturated amide compounds (e.g., acrylamide, methacrylamide), (meth)acrylic acid, maleic acid compounds (e.g., maleic acid, dialkyl maleate, maleic anhydride, N-phenylmaleimide), vinyl alkyl ethers (e.g., vinyl methyl ether, vinyl ethyl ether).

These olefinic resins are obtained by any generally known polymerization process, and these are random copolymers, block copolymers, or graft copolymers, and the form can be arbitrarily selected.

These olefinic resins can be used either singly or in combination. From the viewpoint of dispersibility in the polyacetal resin, of the olefinic resins, preferably employed are polyethylene (e.g., low-density polyethylene, high-density polyethylene), olefine-alkyl (meth)acrylate copolymer, olefine-(meth)acrylic acid metal salt (ionomer), olefine-carbon monoxide-alkyl (meth)acrylate ternary copolymers.

The stabilized red phosphorus content of the composition constituted a stabilized red phosphorus and a thermoplastic resin can be selected within the range of from 3 to 80% by weight, preferably from 5 to 70% by weight (e.g., 10 to 60% by weight, particularly 20 to 60% by weight). For example, the stabilized red phosphorus master batch can be prepared by, for example, heat-mixing predetermined amounts of a stabilized red phosphorus and a thermoplastic resin using a kneader, a banbury mixer, a mixing roll, or an extruder to give a blend of the stabilized red phosphorus dispersed in the thermoplastic resin. The blend may be in the form of either a powder or pellets. Incidentally, in the preparation of the stabilized red phosphorus master batch, a variety of additives, such as an aromatic compound being a constituent of the flame retardant, other flame retardants, an antioxidant, a variety of stabilizers, an inhibitor for inhibiting the formation of a phosphorus derivative from a phosphine (phosphine inhibitor) (e.g., metal hydroxides, metal oxides, olefinic compounds having an electron-withdrawing group in the α-position, unsaturated aliphatic compounds), a lubricant, a pigment, etc., may be incorporated into the master batch in combination.

[Aromatic Compound]

There is no particular restriction as to the aromatic compound provided that it accelerates or improves the flame-retardation in association with the phosphorus-containing compound. By being used in combination with the phosphorus-containing compound, it accelerates the carbonization of a polyacetal resin and renders it flame-retardant. That is, the aromatic compound does not contribute to the flame-retardation of the polyacetal resin by itself, but greatly improves the flame-retardation of the resin by being used in combination with a phosphorus-containing compound and seems to function as a carbonization auxiliary. Such aromatic compound can be experimentally selected according to, when 10 to 80 parts by weight of a flame retardant having a red phosphorus to aromatic compound ratio of 60/40 to 20/80 (weight %) is added to 100 parts by weight of a polyacetal resin and its combustibility (flame retardancy) is evaluated by having the composition get near a flame for 10 seconds, whether they are self-extinguishable or not within 30 seconds, preferably 10 seconds since the flame has been taken away.

From the viewpoints as were described above, such ordinary additives as antioxidants, light stabilizers, and weather (light) resistant stabilizers are not categorized as aromatic compounds. In other words, aromatic compounds usually have no steric hindrance group (e.g., bulky tertiary alkyl groups such as t-butyl group). They not only have little or no oxidation inhibiting capability but is poor or devoid of the ability of preventing the degradation of the resin due to the absorption of energy in the ultraviolet ray region.

Typical aromatic compounds are usually compounds having a hydrocarbon ring reactive to formaldehyde (e.g., aromatic compounds having at least one group selected from phenolic hydroxyl group and amino group) and derivatives thereof.

Further, the aromatic compound is usually preferred to be non-volatile at room temperatures (15 to 30° C.) and have a boiling point higher than the mold-processing temperature. Moreover, the aromatic compound is usually in a solid or viscous state at room temperatures. There is no particular restriction as to the molecular weight of the aromatic compound and may be a low- or high-molecular weight one, and the aromatic compound includes compounds ranging from oligomers to resins. There is no particular index with which to distinguish low-molecular weight compounds from high-molecular weight ones and, for example, compounds having a molecular weight of 250 or higher can be taken to be high-molecular weight aromatic compounds.

[Low-molecular Weight Aromatic Compounds]

Low-molecular weight aromatic compounds include a variety of compounds which develop high flame-retardancy by being used in combination with a phosphorus-containing compound. The aromatic compound may usually have an electron-donating group represented by hydroxyl group and amino group. Hydroxyl group-containing compounds include high-boiling point phenols [compounds having a melting point of 50° C. or higher (e.g., about 60 to 230° C.) and a boiling point of 200° C. or higher (e.g., 210 to 350° C.), such as monovalent phenols such as xylenol, phenylphenol, cumylphenol, naphthol, and binaphtol, divalent phenols such as catechol, resorcin, hydroquinone, and 2,6-dihydroxynaphthalene, trivalent phenols such as pyrogallol and phloroglucine, phenol lignin]; bisphenols [e.g., 4,4-biphenol, 3,3-diphenyl-4,4-dihydroxybiphenyl, bis(4-hydroxyphenyl)methane, bis(4-hydroxyphenyl) phenylmethane, bis(4-hydroxyphenyl)naphthylmethane, bis (4-hydroxyphenyl)(4-isopropylphenyl)methane, bis(3,5-dichloro4-hydroxyphenyl)methane, bis(3,5-dimethyl-4-hydroxypheny)methane, 1,1-bis(4-hydloxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl) ethane, 2-methyl-1,1-bis(4-hydroxyphenyl)propane, 2,2-bis (4-hydroxyphenyl)propane, 2,2-bis(3,5-dimethyl-4-hydroxyphenyl)propane, 1-ethyl-1,1-bis(4-hydroxyphenyl) propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl) propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 2,2-bis(4-hydroxyphenyl)1,1,1,3,3,3-hexafluoropropane, and other dihydroxydiarylalkanes; 1,1-bis(4-hydroxyphenyl)cyclohexane, 1,1-bis(3,5-dichlo-4-hydroxyphenyl)cylohexane, 1,1-bis(4-hydroxyphenyl) cyclodecane, 1,1-bis(4-hydroxyphenyl)-3,3,5-trimethylcylohexane, and other dihydroxydiaryl-cycloalkanes; 1,4-bis(4-hydroxyphenylisopropyl)benzene, and other dihydroxyarylalkylbenzenes; bis(4-hydroxyphenyl)sulfone, bis(3,5-dimethyl-4-hydroxyphenyl)

sulfone, bis(3-chloro-4-hydroxyphenyl)sulfone, and other dihydroxydiarylsulfones; bis(4-hydroxyphenyl)ether, bis(3,5-dimethyl-4-hydroxyphenyl)ether, and other dihydroxydiaryl ethers; 4,4'-dihydroxybenzophenone, 3,3',5,5'-tetramethyl-4,4'-dihydroxyphenzophenone, and other dihydroxydiarylketones; bis(4-hydroxyphenyl)sulfide, bis(3-methyl-4-hydroxyphenyl)sulfide, bis(3,5-dimethyl-4-hydroxyphenyl)sulfide, and other dihydroxydiarylsulfides; bis(4-hydroxyphenyl)sulfoxlde and other dihydroxydiarylsulfoxide; 4,4'-dihydroxydiphenyl and other dihyroxydiphenyls; 9,9-bis(4-hydroxyphenyl)fluorene, and other dihydroxydiarylfluorenes; polyphenols [e.g., 2,4,4'-trihydroxybenzophenone, 2,2',4,4'-tetrahydroxybenzophenone, 2,4,4'-trihydroxyphenylether, 2,2',4,4'-tetrahydroxyphenylether, 2,2,4'-trihydroxydlphenyl-2-propane, 2,2'-bis(2,4-dihydroxyphenyl)propane, 2,2',4,4'-tetrahydroxydiphenylmethane, 2,4,4'-trihydroxydiphenylmethane, 1-[α-methyl-α-(4'-dihydroxyphenyl)ethyl]-3-[α',α'-bis(4"-hydroxyphenyl)ethyl]benzene, 1-[a-methyl-α-(4'-dihydroxyphenyl)ethyl]-4-[α',α'-bis(4"-hydroxyphenyl)ethyl]benzene, α,α',α"-tris(4-hydroxyphenyl)-1,3,5-triisopropylbenzene, 2,6-bis(2-hydroxy-5'-methylbenzyl)-4-methylphenol, 4,6-dimethyl-2,4,6-tris(4-hydroxyphenyl)-2-heptene, 4,6-dimethyl-2,4,6-tris(4-hydroxyphenyl)-2-heptane, 1,3,5-tris(4-hydroxyphenyl)benzene, 1,1,1-tris(4-hydroxyphenyl)ethane, 2,2-bis[4,4-bis(4-hydroxyphenyl)cyclohexyl]propane, 2,6-bis(2-hydroxy-5-isopropylbenzyl)-4-isopropylphenol, bis[2-hydroxy-3-(2'-hydroxy-5'-methylbenzyl)-5-methylphenyl]methane, bis[2-hydroxy-3-(2'-hydroxy-5'-ispropylbenzyl)-5-methylphenyl]methane, tetrakis(4-hydroxyphenyl)ethane, tris(4-hydroxyphenyl)phenylmethane, 2',4',7-trihydroxyflavane, 2,4,4-trimethyl-2',4',7-trihydroxyflavane, 1,3-bis(2,4-3) dihyroxyphenylisopropyl) benzene, tris(4-hydroxyphenyl)-amyl-s-triazine, tris(4-hydroxybenzyl)isocyanurate, and calix arenes (e.g., cyclic oligomers produced from phenols and aldehydes)]; derivatives thereof [e.g., metal salts (salts with alkaline metals, alkaline earth metals, metals of the Group 1B, 2B, 3B, 4B, and 8 of the Periodic Table of Elements), esters with organic acids (e.g., acetate derivatives), ethers with epoxy compounds (e.g., glycidyl ether derivatives), and adducts of hydroxyl group-containing compounds with $C_{2-4}$ alkylene oxides (e.g., ethylene oxide, propylene oxide) (e.g., ethylene oxide adducts with bisphenol A or 2,6-dihydroxynaphthalene)].

Examples of amino and hydroxyl groups-containing compounds are aminophenols (e.g., 2-aminophenol, N,N-dimethylaminomethylphenol, aminonaphthol, 4,4'-diamino-2'-hydroxytriphenylmethane, benzoxazine), phenoltriazines [e.g., N-(p-hydroxybenzyl)melamine, hydroxyphenyltriazine (e.g., compounds recited in the specification of EP2219012), hydroxyphenyl-ureido-triazine (e.g., compounds recited in Japanese Patent Application 65553/1975), and 2,4-diamino-6-(p-hydroxyphenylethyl)-1,3,5-triazine].

Amino group-containing compounds include aryl compounds (e.g., o-toluidine, p-toluidine, p-phenylenediamine, 1,4-naphthalenediamine), bisaryl compounds [e.g., 4,4'-diaminodiphenyl(diphenylenediamine), 3,3',4,4'-tetraaminobiphenyl, 4,4'-diamino-3,3'-diethylbiphenyl, 4,4'-diamino-3,3'-dimethoxybiphenyl, bis(4-aminophenyl)methane, bis(4-amino-3-methylphenyl)methane, bis(4-amino-3-ethylphenyl)methane, bis(3-chloro-4-aminophenyl)methane, 1,3-bis(4-aminophenoxy)neopentane, bis(4-aminophenyl)ether, bis(4-aminophenyl)sulfone, bis(4-aminophenyl)ketone, 4,4'-diaminobenzanilide, 1,4-bis(4-aminobenzyl)benzene, α,α'-bis(4-aminophenyl)-1,4-diisopropylbenzene, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 2,2-bis[4-(4-aminophenoxy)phenyl]propane, bis[4-(3-aminophenoxy)phenyl]sulfone, 9,9-bis(4-aminophenyl)fluorene], and triaryl compounds [e.g., leucoaniline]. Particularly, with respect to diamino group-containing compounds, it is recommended that "Polymer Handbook -basic concept- p.247–257 (1986), published by Baifukan" be referred.

Moreover, there are also exemplified o-substituted compound (e.g., diphenyl ether, diphenoxybenzene, and condensates of these compounds with aldehydes) and N-substituted compounds [e.g., diphenylamine, dinaphthylamine, N,N'-diphenylbenzidine, 4,4'-di(α,α-dimethylbenzyl)diphenylamine].

[High-molecular Weight Aromatic Compounds or Aromatic Ring-containing Resins]

High-molecular weight aromatic compounds usually contain an aromatic ring and are, in many cases, oligomers or resins. Therefore, high-molecular weight aromatic compounds are sometimes referred to as aromatic ring-containing compounds.

These aromatic ring-containing resins usually contain, as an aromatic ring, an aryl ring (e.g., benzene ring, naphthalene ring) or a bisaryl unit (e.g., bisphenol unit) in the repeating unit.

Examples of the aromatic ring-containing resins are (1) resins having an aromatic ring containing at least either a hydroxyl group or an amino group, (2) aromatic nylon resins, (3) polycarbonate resins, (4) polyarylate resins, (5) aromatic epoxy resins, and (6) aromatic polyether resins. These resins can be used either singly or in combination.

(1) Resins Having at Least Either Hydroxyl Group or Amino Group

The resin need only have the aromatic ring containing at least either a hydroxyl group or an amino group in the main chain and/or as a side chain. Examples of a resin having an aromatic ring in the main chain are novolak resins, aralkyl resins, aniline resins, oxidized polymers of low-molecular weight phenols and anilines (e.g., low-molecular weight aromatic compounds containing phenol or aniline) (e.g., resins that can be obtained using a peroxidase as an enzyme, which was reported in the treatise presented in "Polymer Processing, vol.47, No. 11, p.489–494 (1998), phenol-modified resins [e.g., terpene phenol resins (e.g., the resin disclosed by Japanese Patent Application Laid-Open No. 292214/1995, trade name "YS Polyster-seriess" "Mighty-series" manufactured by Yasuhara Chemical K.K., trade name "Tamanol" manufactured by Arakawa Kagaku Kogyo, K.K.), rosin-modified phenolic resins (including reaction products with polyhydric alcohols), cyclopentadiene-phenol polymer (e.g., "DPP-600M" manufactured by Nippon Sekiyu Kagaku, K.K.), liquid polybutadiene-phenol polymers (e.g., trade name "PP700-300" manufactured by Nippon Sekiyu Kagaku K.K.)]. Examples of a resin having an aromatic ring as a side chain are aromatic vinyl resins.

(Novolak Resin)

The novolak resin has a repeating unit represented by the following formula (4):

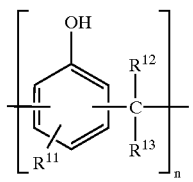

(4)

wherein $R^{11}$ represents a hydrogen atom, an alkyl group, or an aryl group, $R^{12}$ and $R^{13}$ are the same or different, each representing a hydrogen atom, an alkyl group, or an aryl group, and n denotes an integer of 1 or greater.

Examples of the alkyl group are $C_{1-20}$ alkyl groups such as methyl, ethyl, butyl, t-butyl, hexyl, octyl, nonyl, and dodecyl, and $C_{1-12}$ alkyl groups are preferred. Exemplified as the aryl groups are $C_{6-20}$ aryl groups such as phenyl and naphtyl and substituted aryl groups (e.g., methylphenyl group, ethylphenyl group).

Novolak resins (particularly, random novolak resins) are usually obtained by reacting phenols with aldehydes. Phenols include phenol, p- or m-cresol, 3,5-xylenol, alkylphenols (e.g., $C_{1-20}$ alkylphenols such as t-butylphenol, p-octylphenol, nonylphenol) and arylphenols (e.g., phenylphenol, benzylphenol, cumylphenol). These phenols can be used either singly or in combination.

Examples of aldehydes are aliphatic aldehydes such as formaldehyde, acetaldehyde, and propionaldehyde and aromatic aldehydes such as benzaldehyde and phenylacetaldehyde. Preferred aldehydes are formaldehyde. Moreover, condensates of formaldehyde, such as trioxane and paraformaldehyde, are also available. The ratio of a phenol to an aldehyde is 1/0.5 to 1/1 (molar ratio).

Condensation of a phenol with an aldehyde is usually carried out in the presence of an acid catalyst. Exemplified as the acid catalyst are inorganic catalysts (e.g., hydrochloric acid, sulfuric acid, phosphoric acid) and organic catalysts (e.g., p-toluenesulfonic acid. oxalic acid, lactic acid).

The novolak resins enumerated above include high-orthonovolak resins having an ortho/para ratio of not smaller than 1. As to how methylene groups are bonded in the novolak resin, methylene groups and hydroxyl groups in the aromatic rings may be bonded at (i) the ortho-position, ii) the ortho-position and the para-position, or (iii) the para-position.

The ortho/para ratio is expressed by the following formula. In the formula, the number of methylene bonds bonded at the para-position is denoted by $M_P$, the number of methylene bonds bonded at the ortho- and para-positions is denoted by $M_{OP}$, and the number of methylene bonds bonded at the ortho-position is denoted by $M_O$.

Ortho/para ratio=$[M_O+(1/2)M_{OP}]/[M_P+(1/2)M_{OP}]$

To be concrete, the ortho/para ratio can be calculated using the formula and the number of methylene bonds determined by $^{13}$C-NMR spectrum measurement.

Particularly, as the novolak resin of the present invention, preferably employed is any of those having an ortho/para ratio of not less than 1, e.g., about 1 to 20 (particularly, 1 to 15), that is, a so-called high-ortho novolak resin.

A novolak resin having an ortho/para ratio of 1 or more can be synthesized by, e.g., (1) a process in which, in the presence of at least one catalyst selected from a metal salt, a metal oxide, a metal hydroxide, and an amine compound, or after another addition-condensation reaction has been carried out, an acid catalyst is added to react a phenol with an aldehyde [e.g., Japanese Patent Application Laid-Open No. 90523/1980 (JP-55-90523A), Japanese Patent Application Laid-Open No. 51714/1982 (JP-57-51714A), Japanese Patent Application Laid-Open No. 80418/1984 (JP-59-80418A), Japanese Patent Application Laid-Open No. 230815/1987 (JP-62-230815A), U.S. Pat. No. 4,113,7001], (2) a process in which a phenol is reacted with an aldehyde in a non-polar solvent (e.g., aromatic hydrocarbons such as xylene, toluene, and benzene, alicyclic hydrocarbons such as cyclohexane) under applied pressure [e.g., Japanese Patent Application Laid-Open No. 345837/1994 (JP-6-345837), Makromol. Chem. 182, 2973 (1981)], (3) a process in which, without using a catalyst, a phenol is reacted with an aldehyde according to a strictly regulated procedure and under strictly controlled conditions [e.g., Japanese Patent Application Laid-Open No. 195158/1998 (JP-10-195158A, Japanese Patent Application Laid-Open No. 214139 (JP-10-204139A)], or (4) a process in which such a metal phenolate as magnesium bromide and magnesium methylate with an aldehyde in the non-polar solvent [e.g., U.S. Pat. No. 4097463, Macromolecules, 17, 19, (1984)]. The ratio of the phenol to the aldehyde is the former/the latter=about 1/0.3 to 1/1 (molar ratio).

Exemplified as the metal catalyst are polyvalent metal salts of organic acids (e.g., acetic acid, naphthenic acid, oxalic acid, and other aliphatic carboxylic acids; methanesulfonic acid and other sulfonic acids) (e.g., salts with Zn, Mg, Mn, Cd, Ca, Co, Pb, Cu, Ni, and Al). Examples of the metal oxide and metal hydroxide are polyvalent metal oxides and polyvalent metal hydroxides (e.g., oxides and hydroxides of Zn, Mg, Mn, Cd, Ca, Co, Pb, Cu. Ni, and Al). Exemplified as the amine compound are aliphatic amines (e.g., dimethylamine, diethylamine). These catalysts can be used either singly or in combination.

Although the high-ortho novolak resin can be used even if the catalyst, i.e., a metal salt, a metal oxide, or a metal hydroxide, remains therein, it would be desirable that the amount of the residual catalyst is reduced by washing or other means. Moreover, a high-ortho novolak resin obtainable by the process (3) is preferable, for the process (3) does not involve the use of a catalyst and thus the resulting resin is free from catalyst.

Incidentally, a co-condensate of the phenol with a co-condensable component such as a dioxybenzene, a naphthol, a bisphenol (e.g., bisphenol A, bisphenol S, and other bisphenols mentioned above), an alkylbenzene (e.g., toluene, ethylbenzene, xylene, mesitylene), aniline, furfural, an urea (e.g., urea, melamineguanamine, acetoguanamine, benzoguanamine), melamine, terpene, cashew nut, and rosin. Such co-condensed phenol resin includes phenol/melamine/formaldehyde condensate, phenol/guanamine/formaldehyde condensate, phenol/benzoguanamine/formaldehyde condensate, and particularly phenol/melamine novolak resin, these being prepared in the presence of an acid and/or an alkaline catalyst.

Moreover, modified novolak resins (e.g., phosphoric acid-modified novolak resin or a boric acid-modified resin) can be employed, such resins being novolak resins (random novolak resin, high-ortho novolak resin) in which phenolic hydroxyl groups are partially or wholly modified with at least one compound selected from phosphoric compounds (e.g., phosphoric acid, phosphorous acid, phosphates, phosphites, phosphoric chlorides, phosphorous chlorides, and other phosphoric compounds and phosphorous compounds) and boric compounds (e.g., boric acid, borates, boric chlorides, and other boric compounds). The hydroxyl group in the novolak resin is usually modified to a phosphate or a borate.

Modified novolak resins being novolak resins (random novolak resins and high-ortho novolak resins) in which the hydrogen atom of the phenolic hydroxyl group is partially or wholly modified with a metal ion, a silyl group, an organic group (e.g., an alkyl group, an alkanoyl group, a benzoyl group, and other acyl groups) or a $C_{2-4}$alkylene oxide are also available.

Preferred as the novolak resin is, for example, phenol-formaldehyde novolak resin, an alkylphenolformaldehyde resin (e.g., t-butylphenolformaldehyde novolak resin, p-octylphenolformaldehyde resin), a co-condensate thereof, or a mixture thereof.

There is no particular restriction as to the number average molecular weight of the novolak resin (random novolak resin and high-ortho novolak resin), and it can be selected within the range of 300 to $5 \times 10^4$, preferably 300 to $1 \times 10^4$, more preferably 300 to 8,000 (e.g., particularly, 300 to 5,000).

(Aralkyl Resin)

The aralkyl resin to be used in the present invention has a structural unit represented by the formula (5):

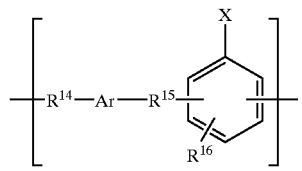

(5)

wherein Ar represents an aromatic group, $R^{14}$ and $R^{15}$ are the same or different, each representing an alkylene group, $R^{16}$ represents a hydrogen atom or an alkyl group, and X represents a hydroxyl group, an amino group, or an N-substituted amino group.

Examples of the aromatic group are those having 6 to 20 carbon atoms, such as phenylene groups (e.g., o-, m-, and p-phenylene groups) and naphthylene group, with phenylene groups (particularly, p-phenylene group) particularly preferred. Examples of the alkylene group are methylene group, ethylene group, propylene group, butylene group, and other $C_{1-4}$alkylene groups, with $C_{1-2}$alkylene groups preferred. Exemplified as the alkyl group are methyl, ethyl, butyl, t-butyl, hexyl, octyl, nonyl, dodecyl, and other $C_{1-20}$alkyl groups, with $C_{1-4}$alkyl groups preferred. Examples of the N-substituted amino group represented by X include mono- or di-$C_{1-4}$alkylamino groups, such as dimethylamino group and diethylamino group.

Although it does not matter if the aralkyl resin is an aniline aralkyl resin with an amino group as X, it is in many cases a phenol aralkyl resin having a hydroxyl group as X. Preferable phenol alkyl resins include those having methylene groups as $R^{14}$ and $R^{15}$, a phenylene group as Ar, a hydrogen atom as $R^{16}$, and a p-xylene-substituted phenol represented by the following formula (6) as a repeating unit.

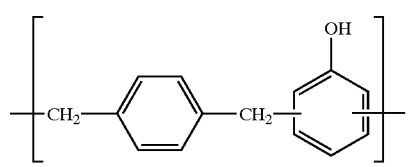

(6)

Generally, the aralkyl resin can be obtained by reacting a compound of the formula (7) with a phenol or an aniline. A phenolalkyl resin is formed through the use of a phenol, and an anilinearalkyl resin is formed through the use of an aniline.

(7)

In the formula, Y represents an alkoxy group, an acyloxy group, a hydroxyl group, or a halogen atom, and Ar, $R^{17}$, and $R^{18}$ have the same meanings as defined above.

In the formula (7), alkoxy groups that can be represented by Y include $C_{1-4}$ alkoxy groups such as methoxy, ethoxy, propoxy, and butoxy. Examples of the acyloxy group include acyloxy groups having about 2 to 5 carbon atoms, such as acetoxy group. Moreover, examples of the halogen atom include chlorine, bromine, and iodine.

Exemplified as the compound represented by the formula (7) are xylylene glycol $C_{1-4}$alkylethers (e.g. p-xylylene glycol dimethylether, p-xylylene glycol diethylether) and other aralkylethers, p-xylylene-α,α'-dichloride, p-xylylene-α,α'-dibromide, and other aralkyl halides.

Examples of the phenol are phenol and alkylphenols (e.g., cresol, xylenol, t-butylphenol, octylphenol, nonylphenol, and other $C_{1-20}$alkylphenols). These phenols can be used either singly or in combination.

Examples of the aniline are aniline, alkylanilines (e.g., toluidine, xylidine, octylaniline, nonylaniline, and other $C_{1-20}$alkylanilines), and N-alkylanilines (e.g., N,N-dimethylanlline. N,N-diethylaniline, and other N-$C_{1-4}$alkylanilines). These anilines can be used either singly or in combination. The ratio of the compound of the formula (7) to the phenol or aniline is, e.g., the former/the latter=1/1 to 1/3 (molar ratio), preferably about 1/1 to 1/2.5 (molar ratio).

The reaction between the compound of the formula (7) and the phenol or aniline may be carried out in the presence or absence of a catalyst. For example, in the case where an aralkylether is employed as the compound of the formula (7), the reaction may be effected in the presence of a catalyst. In the case of the use of an aralkyl halide, the reaction may be effected in the absence of a catalyst.

Examples of the catalyst are dimethyl sulfate, diethyl sulfate, tin chloride, aluminum chloride, and other Friedel-Crafts catalysts.

The reaction may be effected in the presence or absence of a solvent. The reaction temperature is for example about 50 to 250° C., preferably 100 to 230° C. When an aralkyl halide is employed as a reactant, the range of the reaction temperature may be lower than the one mentioned above. For example, the reaction temperature may be about 50 to 150° C., particularly about 70 to 130° C.

In the reaction described above, together with the phenol and/or aniline, there may be additionally used a co-condensable component, such as aldehyde (e.g., formaldehyde, acetaldehyde, propionaldehyde, and other aliphatic aldehydes; benzaldehyde, phenylacetaldehyde, and other aromatic aldehydes), an oxybenzoate (e.g., p-oxybenzoate; p-methyloxybenzoate, p-ethyloxybenzoate, and other p-alkyloxybenzoates), an oxybenzene (e.g., dioxybenzene, trioxybenzene), a naphthol (e.g., 1-naphthol, 2-naphthol, 1,6-dihydroxynaphthalene, 2,7-dihydroxynaphthalene, hydroxynaphthoic acid, hydroxynaphthoic acid alkyl esters), a bisphenol (e.g., bisphenol A, bisphenol S, and other bisphenols as mentioned above), an alkylbenzene (e.g., toluene, ethylbenzene., xylene, mesitylene), an aniline, a furfural, a urea (e.g., urea, melamine, guanamine, acetoguanamine, benzoguanamine), and a melamine.

Further, also available as the aralkyl resin is a modified aralkyl resin in which at least part of the hydroxyl group or amino group denoted by X has been modified with at least one member selected from a phosphorus compound (e.g., phosphoric acid, phosphorous acid, organic phosphonic acid, organic phosphinic acids, and other phosphorus-containing acids, and acid anhydrides, halides, salts, and esters thereof) and a boron compound (e.g., boric acid, organic boronic acids, organic borinic acids, and other boric acids, anhydrides, halides, salts, and esters thereof) (e.g., phosphoric acid-modified phenolaralkyl resin, phosphoric acid-modified anilinearalkyl resin, boric acid-modified phenolaralkyl resin, boric acid-modified anilinearalkyl resin). Usually, the hydroxyl group of the aralkyl resin has been modified into a phosphate or borate, and the amino group, in many cases, to a boric acid amide.

Furthermore, also available as the aralkyl resin is a modified phenol aralkyl resin in which the hydrogen atom of the hydroxyl group denoted by X has been partially or wholly modified with a metal ion, a silyl group, an organic group (e.g., alkyl group, alkanoyl group, benzoyl group and other acyl groups), or with a $C_{2-4}$alkylene oxide (e.g., ethylene oxide, propylene oxide).

The softening point of the aralkyl resin thus obtained is, for example, about 40 to 160° C., preferably about 50 to 150° C., more preferably about 55 to 140° C.

If necessary, the aralkyl resin may be cured or modified. Usually, curing or modification can be effected by a conventional method, such as methylene-crosslinking with the use of a polyamine (hexamethylenetetramine) and epoxy-crosslinking with the use of an epoxy compound (e.g., a polycyclic epoxide).

Furthermore, if necessary, the aralkyl resin may be modified with an elastomer. Modification with an elastomer can be chemically effected using a synthetic rubber, a polyolefine (e.g., polyisobutylene, polyethylene), or other elastomers.

Of aralkyl resins, phenol, aralkyl resins are available under the trade name "Milex" (manufactured by Mitsui Chemicals Inc.), "Xylok" (manufactured by Albright & Wilson), and "Sumilite resin" (manufactured by Sumitomo Durez., Co., Ltd.). Moreover, aniline aralkyl resins are available under the trade name "Anilix" (manufactured by Mitsui Chemicals Inc.).

(Aniline Resin)

Generally, the aniline resin is obtained through the reaction between an aniline and an aldehyde.

Examples of the aniline are aniline, naphthylamine, alkylanilines (e.g., toluidine, xylidine, octylaniline, nonylaniline, and other $C_{1-20}$alkylanilines), N-alkylanilines (e.g., N,N-dimethylaniline, N,N-diethylaniline, and other N—$C_{1-4}$alkylanilines), and bisanilines (e.g., benzidine, 4,4'-diaminodiphenylmethane, and the other bisanilines enumerated above). These anilines may be used either singly or in combination.

Examples of the aldehyde are formaldehyde, acetaldehyde, propionaldehyde, other aliphatic aldehydes, benzaldehyde, phenylacetaldehyde, and other aromatic aldehydes. Preferred as the aldehyde are formaldehyde, and others. Moreover, a condensate of formaldehyde, such as trioxane and paraformaldehyde, is also usable. The ratio of the aniline to the aldehyde is the former/the latter=about 1/0.5 to 1/1.5 (molar ratio).

Usually, condensation of the aniline with the aldehyde is effected in the presence of an acid catalyst or in a neutral system. Exemplified as the acid catalyst are inorganic catalysts (e.g., hydrochloric acid, sulfuric acid, phosphoric acid) and organic catalysts (e.g., p-toluenesulfonic acid, oxalic acid).

Incidentally, a co-condensate of the aniline with a co-condensable component can also be used, and examples of the con-condensable component are dioxybenzenes, phenols (e.g., phenol, cresol, xylenol, alkylphenols, arylphenols), naphthols, bisphenols (e.g., bisphenol A, bisphenol S, and the other bisphenols enumerated above), alkylbenzenes (e.g., toluene, ethylbenzene, xylene, mesitylene), furfurals, ureas (e.g., urea, melamine, guanamine, acetoguanamine, benzoguanamine), terpenes, and cashew nuts.

(Aromatic Vinyl Resin)

As the aromatic vinyl resin, there may for example be employed a resin having a structural unit represented by the following formula (8):

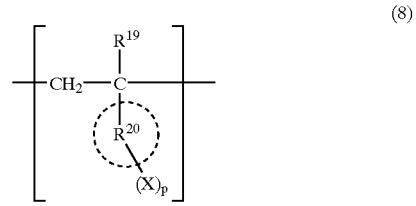

(8)

wherein $R^{19}$ represents hydrogen atom or a $C_{1-3}$alkyl group, $R^{20}$ represents an aromatic ring, X represents hydroxyl group, amino group, or an N-substituted amino group, and p denotes an integer of 1 to 3.

In the formula (8), preferred as the $C_{1-3}$ alkyl group is methyl group. Moreover, examples of the aromatic ring are benzene ring, naphthalene ring, and other $C_{6-20}$ aromatic rings. Incidentally, the aromatic ring may have a substituent (e.g., hydroxyl group; methyl, ethyl, propyl, isopropyl, butyl, isobutyl, s-butyl, t-butyl, and other alkyl groups; methoxy, ethoxy, propoxy, and other alkoxy groups).

In the formula (8), in the case where X represents hydroxyl group, the hydrogen atom of the hydroxyl group may be protected with a metal ion, a silyl group or an alkoxy group, an alkyl group, an alkaloyl group, a benzoyl group, or other organic groups (protective group).

Resins obtainable from such derivative has, for example, a structural unit represented by the following formula (9):

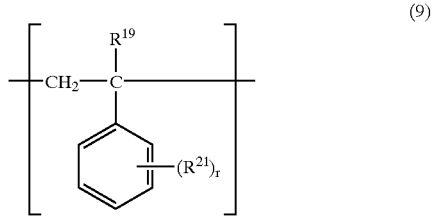

(9)

wherein $R^{19}$ has the same meaning as defined above, $R^{21}$ is a group selected from the group consisting of —OH, —O(CH$_2$CH$_2$O)$_q$H, —O(CH$_2$CH(CH$_3$)O)$_q$H, —OSi (R$^{22}$)$_3$, and —OM (M represents a metal cation, OR$^{22}$ and OCOR$^{22}$, $R^{22}$ is a carbon atom, or an alkyl or aryl group having 1 to 5 carbon atoms), q denotes an integer of 2 to 3, and r is an integer of 1 to 3.

In the formula, M may be any monovalent alkaline metal cation (e.g., sodium, lithium, potassium), a divalent alkaline earth metal cation (e.g. magnesium, calcium), or a transition metal cation.

In the formula (8), when X is an N-substituted amino group, the N-substituted amino group includes mono- or di-$C_{1-4}$alkylamino groups, such as dimethylamino group and diethylamino group.

R²¹ in the formula above need only exist in the ortho-, meta-, or para-position. Further, in addition to the substituent R²¹, the pendant aromatic ring may be substituted with an alkyl group having 1 to 4 carbon atom.

The aromatic vinyl-series resin includes a homo- or copolymers of an aromatic vinyl monomer having a hydroxyl group, an amino group, or an N-substituted amino group corresponding to the structural unit (8), a copolymer of the aromatic vinyl monomer with a copolymerizable monomer, and a reduced polymer of an aromatic vinyl polymer having a nitro group.

Examples of the aromatic vinyl monomer include vinylphenol, dihydroxystyrene, vinyl naphthol, and other hydroxyl group-containing aromatic vinyl monomers, vinylaniline, diaminostyrene, N,N-dimethylaminostyrene, and other amino- or N-substituted amino group-containing aromatic vinyl monomers.

Examples of the copolymerizable monomer are (meth) acrylic monomers [e.g., (meth)acrylic acid, (meth)acrylates (e.g., methyl (meth)acrylate, ethyl (meth)acrylate, butyl (meth)acrylate, 2-ethylhexyl (meth)acrylate, and other $C_{1-18}$alkyl (meth)acrylates, 2-hydroxyethyl (meth)acrylate, and other hydroxyl group-containing monomers, glycidyl (meth)acrylate), (meth)acrylamide, (meth)acrylonitrile], styrenic monomers (e.g., styrene, vinyl toluene, α-methylstyrene, chlorostyrene, vinylnaphthalene, vinylcyclohexane), polymerizable polycarboxylic acids (e.g., fumaric acid, maleic acid), maleimide-series monomers (e.g., N-alkylmaleimide, N-phenylmaleimide), diene-series monomers (e.g., isoprene, 1,3-butadiene, 1,4-hexadiene, dicyclopentadiene), and vinyl-series monomers (e.g., vinyl acetate, vinyl propionate, and other vinyl esters; methyl vinyl ketone, methyl isopropenyl ketone, and other vinyl ketones; vinyl isobutyl ether, vinyl methyl ether, and other vinyl ethers; N-vinylcarbazole, N-vinylpyrrolidone, N-vinylimidazole, and other nitrogen-containing vinyl monomers). These copolymerizable monomers can be used either singly or in combination.

The ratio of the aromatic vinyl monomer to the copolymerizable monomer is for example about 10/90 to 100/0 (weight %), preferably about 30/70 to 100/0 (weight %), more preferably about 50/50 to 100/0 (weight %).

Preferred as the aromatic vinyl resin are vinylphenol homopolymers (polyhydroxystyrene), particularly p-vinylphenol homopolymer.

There is no particular restriction as to the number average molecular weight of the aromatic vinyl resin, and it can be selected within the range of, for example, 300 to $50\times10^4$, preferably 400 to $30\times10^4$, more preferably about 500 to $5\times10^4$.

(2) Aromatic Nylon

As the aromatic nylon to be used in the present invention, there may be employed a compound having a unit represented by the following formula (10):

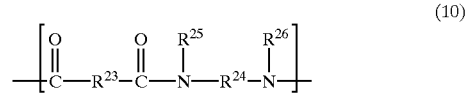

(10)

wherein R²³ and R²⁴ are the same or different, each representing a unit selected from an aromatic unit, an alicyclic unit, and an aliphatic unit; at least either R²³ or R²⁴ contains an aromatic ring; R²⁵ and R²⁶ are the same or different, each representing a hydrogen atom, an alkyl group, or an aryl group; and R²⁵ and R²⁶ may be directly bonded to form a ring.

The aromatic nylon includes: a polyamide derived from a diamino and a dicarboxylic acid, at least one component being an aromatic or alicyclic compound; and an polyamide obtained through the use of an aromatic amino carboxylic acid together with, if necessary, a diamine and/or a dicarboxylic acid together. The aromatic nylon also includes a copolyamide constituted of at least two different kinds of polyamide constitutional components.

As the diamine, there are mentioned, for example, phenylenediamine, diaminotoluene, 2,4-diaminomesitylene, 3,5-diethyl-2,6-diaminotoluene, xylylenediamine (particularly, metaxylylenediamine, paraxylylenediamine), bis(2-aminoethyl)benzene, biphenylenediamine, 4,4'-diamino-3,3'-diethylbiphenyl, diaminodiphenylmethane, bis (4-amino-3-ethylphenyl)methane, bis(4-amino-3-methylphenyl)methane, bis(3-chloro-4-aminophenyl) methane, 1,4-naphthalenediamine, and other aromatic diamines and their N-substituted aromatic diamlnes; 1,3-cyclopentanediamine, 1,4-cyclohexanediamine, bis(4-amino-3-methylcyclohexyl)methane, and other alicyclic diamines; trimethylenediamine, tetramethylenediamine, pentamethylenediamine, hexamethylenediamine, 2,2,4-trimethylhexamethylenediamine, 2,4,4-trimethylhexamethylenediamine, octamethylenediamine, and other aliphatic amines. These diamines can be used either singly or in combination. As the diamine, the use of an aromatic diamine (particularly, xylylenediamine, N,N'-dialkyl-substituted xylylenediamine) is preferred.

Examples of the dicarboxylic acid are oxalic acid, malonic acid, succinic acid, glutaric acid, adipic acid, pimelic acid, suberic acid, azelaic acid, sebacic acid, undecanoic diacid, dodecanoic diacid, hexadecanoic diacid, octadecanoic diacid, and other $C_{2-20}$ aiphatic dicarboxylic acids; phthalic-acid, phthalicanhydride, isophthalic acid, terephthalic acid, naphthalenedicarboxylic acid, and other aromatic dicarboxylic acids; cyclohexane-1,4-dicarboxylic acid, cyclohexane-1,3-dicarboxylic acid, and By other alicyclic dicarboxylic acids; and dimerized fatty acids (dimeric acid). These dicarboxylic acids can be used either singly or in combination. As the dicarboxylic acid, the use of an aliphatic dicarboxylic acid (e.g., a $C_{6-12}$ aliphatic dicarboxylic acid such as adipic acid) is preferred.

Exemplified as the aromatic aminocarboxylic acid are phenylalanine, tyrosine, anthranilic acid, and aminobenzoic acid. These aminocarboxylic acids can also be used either singly or in combination.

As the aromatic nylon, a condensate with a lactam and/or α,ω-aminocarboxylic acid can be employed provided that the properties of the flame retardant are not adversely affected. Examples of the lactam are propionic lactam, butyrolactam, valerolactam, caprolactams (e.g., ε-caprolactam), and other $C_{3-12}$ lactams. As the aminocarboxylic acid, there may be mentioned, for example, 7-aminoheptanoic acid and 10-aminodecanoic acid.

As a subcomponent for the aromatic nylon, at least one or more than one members selected from monobasic acids (e.g., acetic acid, propionic acid, caproic acid, nicotinic acid) and monoamines (e.g., ethylamine, butylamine, benzylamine) can be used as viscosity controlling agents.

Examples of the aromatic nylon are polyamides the diamine component of which is an aromatic compound (e.g., polyamides or copolyamides containing xylylenediamine as the diamine component) and polyamides obtainable from aromatic diamines and α,ω-$C_{4-12}$ dicarboxylic acids (e.g., polyamide (MXD6) obtainable from adipic acid and metaxylylenediamine), polyamide obtainable from suberic acid and metaxylylenediamine, polyamide (PMD6) obtainable from adipic acid and paraxylylenediamine, polyamide obtainable from suberic acid and paraxylylenediamine, polyamide obtainable from adipic acid and N,N'-dimethylmetaxylylenediamine, polyamide obtainable from suberic acid and N,N'-dimethylmetaxylylenediamine, polyamide obtainable from adipic acid and 1,3-phenylenediamine, polyamide obtainable from adipic acid and 4,4'-diaminodiphenylmethane, copolyamide obtainable from adipic acid, metaxylylenediamine, and paraxylylenediamine, copolyamide obtainable from adipic acid, metaxylylenediamine, and N,N'-dimethylmetaxylylenediamine, and polyamide obtainable from 4,4'-diaminobiphenylene and adipic acid). Preferred as the aromatic nylon are polyamides (particularly, MXD 6) of aromatic diamines (particularly, xylylenediamine) and α,ω-$C_{6-12}$ aliphatic dicarboxylic acids. These polyamides can be used either singly or in combination. There is no particular restriction as to the number average molecular weight of the aromatic nylon, and it can be selected within the range of, e.g., 300 to $5 \times 10^4$, preferably 500 to $1 \times 10^4$, more preferably about 500 to 8,000 (particularly, 500 to 5,000).

(3) Polycarbonate Resin

As the polycarbonate resin, a polymer obtainable through the reaction of a dihydroxy compound with phosgene or a carbonic diester [e.g., diaryl carbonates (e.g., diphenyl carbonate) or dialkyl carbonates (e.g., dimethyl carbonate, diethyl carbonate)]. Although it does not matter if the dihydroxy compound is an alicyclic compound, a bisphenol compound is preferred. Moreover, a polyester carbonate resin incorporating an aliphatic or aromatic dicarboxylic acid or its chloride or ester as an auxiliary material is favorably employed.

Exemplified as the bisphenol compound are bis(4-hydroxyphenyl)methane, 1,1-bis(4-hydroxyphenyl)propane, 2,2-bis(4-hydroxyphenyl)propane(bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, 2,2-bis(4-hydroxyphenyl)-4-methylpentane, and other bis(hydroxyaryl)$C_{1-6}$alkanes; 1,1-bis(4-hydroxyphenyl)cyclohexane and other bis(hydroxyaryl)$C_{4-10}$cycloalkanes, 4,4'-dihydroxydiphenylether; 4,4'-dihydroxydiphenylsulfone; 4,4'-dihyroxydiphenylsulfdide: and 4,4'-dihydroxydiphenylketone. In addition to these, examples of the bisphenol compound include the above-mentioned bisphenols being low-molecular weight aromatic compounds (excluding the bisphenol compounds exemplified here).

Preferred polycarbonate resins include bisphenol-based aromatic polycarbonates (particularly, bisphenol A-based aromatic polycarbonates). The polycarbonate resin may be terminated (bonded with) by an alcohol, a mercaptane, or phthalimide (particularly, a monovalent alcohol). Examples of the monovalent alcohol which terminates the polycarbonate resin include monovalent aryl alcohols (e.g., phenols which may be substituted with a $C_{1-10}$ alkyl group and/or a $C_{6-10}$ aryl group, such as phenol, o, m, p-cresols, dimethylphenol, o, m, p-ethylphenols, o, m, p-n-propylphenols, o, m, p-isopropylphenols, o, m, p-n-butylphenols, o, m, p-s-butylphenols, o, m, p-t-butylphenols, o, m, p-phenylphenols, o, m, p-benzylphenols, cumylphenol), monovalent alkyl alcohols (e.g., methtanol, ethanol, n-propanol, isopropanol, butanol, pentanol, hexanol, dodecyl alcohol, stearyl alcohol, and other $C_{1-20}$alkyl monoalcohols), and monovalent aralkyl alcohols (e.g., benzyl alcohol, phenethyl alcohol, and other $C_{7-20}$aralkyl monoalcohols).

Moreover, examples of the polycarbonate include cyclic oligocarbonates and cyclic polycarbonates having no end group.

There is no particular restriction as to the number average molecular weight of the polycarbonate resin, and it can be selected within the range of about 300 to $5 \times 10^4$, preferably about 400 to $1 \times 10^4$.

(4) Polyarylate Resin

As the polyarylate-resin, there may be employed a compound having a structural unit represented by the following formula (11):

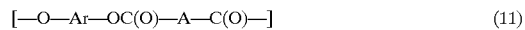

$$[-O-Ar-OC(O)-A-C(O)-] \quad (11)$$

wherein Ar stands for an aromatic group and A stands for an aromatic, alicyclic, or aliphatic group.

Such polyarylate-series resin can be produced by a fusion polymerization method, a solution polymerization method, or an interfacial polymerization with utilizing, as a way of polyesterification, a transesterlflcation method (e.g., acetate method, phenyl ester method), an acid chloride method, a direct method, or an addition polymerization method).

The polyarylate-series resin is obtained through a reaction between an aromatic polyol component and a polycarboxylic acid component (e.g., an aromatic polycarboxylic acid component, an aliphatic polycarboxylic acid component, an alicyclic polycarboxylic acid component). The polycarboxylic acid component usually contains at least an aromatic polycarboxylic acid component.

Usually employed as the aromatic polyol (monomer) is a diol such as a monocyclic aromatic diol and a polycyclic aromatic diol, or reactive derivative thereof [e.g., a salt it of an aromatic polyol (e.g., sodium salt, potassium salt), an ester of an aromatic polyol (e.g., an ester of acetic acid), a silyl-protected aromatic polyol (e.g., trimethylsilylated aromatic polyol)].

Exemplified as the monocyclic aromatic diol are go benzenediols (e.g., resorcinol, hydroquinone, m-xylene glycol, p-xylylene glycol), naphthalenediol, and other aromatic ring diols having about 6 to 20 carbon atoms.

As the polycyclic aromatic diol, there may be mentioned, for example, a bis(hydroxyaryl)(bisphenol), such as 4,4'-dihydroxybiphenyl, 2,2'-biphenol, bis(hydroxyaryl)alkanes [e.g., bis(hydroxyphenyl)methane(bisphenol F), bis(hydroxyphenyl)ethanes (e.g., bisphenol AD), bis(hydroxyphenyl)propanes (e.g., bisphenol A), and other bis(hydroxyaryl)$C_{1-6}$alkanes], bis(hydroxyaryl)cycloalkanes [e.g., bis(hydroxyphenyl)cyclohexane and other bis(hydroxyaryl)$C_{3-12}$cycloalkanes] and bis(hydroxyaryl) carboxylic acids [e.g., bis-4,4-(hydroxyphenyl)butanoic acid and other bis(hydroxyaryl)$C_{2-6}$carboxylic acids]. Moreover, other polycyclic aromatic diols include compounds having a bis(hydroxyaryl)backbone, such as di(hydroxyphenyl)ether, di(hydroxyphenyl)thioether, di(hydroxyphenyl)ketone, di(hydroxyphenyl)sulfoxide, bis($C_{1-4}$alkyl-substituted hydroxyphenyl)alkanes [e.g., bis(3-methyl-4-hydroxyphenyl)methane, bis(3-methyl-4-hydroxyphenyl)propane, bis(3,5-dimethyl-4-hydroxyphenyl)methane, bit(3,5-dimethyl-4-hydroxyphenylpropane] and terpene diphenols (e.g., 1,4-di($C_{1-4}$alkyl-substituted hydroxyphenyl)-p-menthane).

These aromatic polyols can be used either singly or in combination.

Preferred aromatic polyols include bisphenols, such as bis(hydroxyaryl)$C_{1-6}$alkanes (e.g., bisphenol A, bisphenol F, bisphenol AD).

The aromatic polyol may be used together with an aliphatic or alicyclic polyol. Examples of the aliphatic polyol are ethylene glycol, propylene glycol, butanediol, pentanediol, hexanediol, neopentyl glycol, and other $C_{2-10}$ alkylene glycols, and polyoxy$C_{2-4}$alkylene glycols. Examples of the aliphatic polyol include 1,4-cyclohexane dimethanol and other aliphatic polyols having a $C_{3-10}$ aliphatic ring. As the alicyclic polyol, there are mentioned, for example, cyclohexane diol and other $C_{3-10}$ alicyclic polyols.

Exemplified as the aromatic polycarboxylic acid are dicarboxylic acids such as monocyclic aromatic dicarboxylic acids, and polycyclic aromatic dicarboxylic acids, and their reactive derivatives [e.g., acid halides (e.g., acid chloride), esters (e.g., alkyl esters, aryl esters), acid anhydrides].

Examples of the monocyclic aromatic dicarboxylic acid are phthalic acid, isophthalic acid, terephthalic acid, and other benzenedicarboxylic acids, naphthalenedicarboxylic acids such as 2,6-naphthalenedicarboxylic acids and other aryldicarboxylic acids having 8 to 20 carbon atoms. Incidentally, benzenedicarboxylic acids and naphthalenedicarboxylic acids (particularly, benzenedicarboxylic acids) may be substituted with one or two $C_{1-4}$ alkyl groups.

Examples of the polycyclic aromatic dicarboxylic acids are bis(arylcarboxylic acid)s, such as biphenyldicarboxylic acids, bis(carboxyphenyl)methane, bis(carboxyphenyl)ethane, bis (carboxyphenyl)propane, and other bis (carboxyaryl)$C_{1-6}$alkanes; bis(carboxyphenyl)cyclohexane and other bis(carboxyaryl)$C_{3-12}$cycloalkanes; bis (carboxyphenyl)ketone; bis(carboxyphenyl)sulfoxide; bis (carboxyphenyl)ether; and bis(carboxyphenyl)thioethers.

Preferred aromatic polycarboxylic acid components include monocyclic aromatic dicarboxylic acids (particularly, phthalic acid, isophthalic acid, terephthalic acid, and other benzenedicarboxylic acids) and bis (carboxyaryl)$C_{1-6}$alkanes.

The aliphatic polycarboxylic acid (monomer) may be an aliphatic dicarboxylic acid, for example, oxalic acid, malonic acid, succinic acid, glutaric acid, adipic acid, pimelic acid, suberic acid, azelaic acid, sebacic acid, dodecanedioic acid, or any of other $C_{2-20}$ aliphatic dicarboxylic acids, or dicarboxymethylcyclohexane or any of other dicarboxylic acids having a $C_{3-10}$ aliphatic ring. Examples of the alicyclic polycarboxylic acids are alicyclic dicarboxylic acids such as cyclohexanedicarboxylic acid and other $C_{3-20}$alicyclic dicarboxylic acids.

Preferred as the polyarylate resin are, for example, polyarylate resins wherein the aromatic polyol is a bisphenol, such as polyesters of bisphenols (e.g., bisphenol A, bisphenol AD, bisphenol F) with benzenedicarboxylic acids (e.g., isophthalic acid, terephthalic acid) and polyesters of bisphenols with bis(arylcarboxylic acids) [e.g., bis(carboxyphenyl)methane, bis(carboxyphenyl)ethane, bis(carboxyphenyl)propane, and other bis(carboxyaryl)$C_{1-4}$alkyls]. These polyarylate resins can be used either singly or in combination.

If necessary, the polyarylate resin, in addition to an aromatic diol and an aromatic dicarboxylic acid, may incorporate an aromatic triol, an aromatic tetraol [e.g., 1.1.2.2-tetrakis(hydroxyphenyl)ethane], an aromatic tricarboxylic acid, or an aromatic tetracarboxylic acid.

The terminal (or end) of the polyarylate resin may be blocked (bonded to) with an alcohol, a carboxylic acid (particularly, a monovalent alcohol, a monovalent carboxylic acid). Examples of the monovalent alcohol with which the polyarylate resin is to be blocked are aryl alcohols (e.g., monovalent phenols which may be substituted with a $C_{1-10}$ alkyl group and/or a $C_{6-10}$ aryl group, such as phenol, o, m, p-cresols, dimethylphenol, o, m, p-ethylphenols, o, m, p-n-propylphenols, o, m, p-isopropylphenols, o, m, p-n-butylphenols, o, m, p-s-butylphenols, o, m, p-t-butylphenols, o, m, p-phenylphenols, o, m, p-benzylphenols, cumylphenol), alkyl alcohols (e.g., methanol, ethanol, n-propanol, isopropanol, butanol, pentanol, hexanol, dodecyl alcohol, stearyl alcohol, and other $C_{1-20}$ alkyl alcohols), and aralkyl alcohols (e.g., benzyl alcohol, phenethyl alcohol, and other $C_{7-20}$ aralkyl alcohols).

Examples of the monovalent carboxylic acid with which the polyarylate resin is to be blocked include aliphatic carboxylic acids (e.g., acetic acid, propionic acid, octanoic acid, and other $C_{1-20}$ aliphatic carboxylic acids)), alicyclic carboxylic acids (e.g., cyclohexane-carboxylic acid and other $C_{4-20}$ alicyclic carboxylic acids) and monovalent aromatic carboxylic acids (e.g., benzoic acid, toluic acid, o, m, p-t-butylbenzoic acids, p-methoxyphenylacetic acid, and other $C_{7-20}$ aromatic carboxylic acids). The carboxylic acid may be a monovalent aliphatic carboxylic acid substituted with an aromatic group such as phenyl acetate (particularly, a $C_{1-10}$ aliphatic monocarboxylic acid substituted with a $C_{6-20}$ aromatic group).

Examples of the monovalent carboxylic acid further include cyclic oligoarylates and cyclic polyarylates that have no end.

The number average molecular weight of the polyarylate resin is, for example, about 300 to 30×10$^4$, preferably about 500 to 10×10$^4$, more preferably about 500 to 5×10$^4$.

(5) Aromatic Epoxy Resin

Examples of the aromatic epoxy resin include ether-series epoxy resins (e.g., bisphenol-based epoxy resins, novolak-type epoxy resins) and amine-series epoxy resins formed with an aromatic amine component.

Examples of the bisphenol constituting a bisphenol-based epoxy resin are similar to the bis(hydroxyaryls) listed above. Preferred bisphenol-based epoxy resins include epoxy resins formed by the reaction between a bisphenol and epichlorohydrin, such as bis(hydroxyaryl)$C_{1-6}$alkanes, particularly bisphenol A, bisphenol AD, bisphenol F, and other glycidyl ethers. Moreover, examples of the bisphenol-based epoxy resin include the bisphenol glycidyl ethers of high molecular weight mentioned above (e.g., phenoxy resins).

Examples of the novolak resin constituting a novolak-type epoxy resin are those in which an alkyl group (e.g., $C_{1-20}$ alkyl groups, preferably methyl group, ethyl group, and other $C_{1-4}$ alkyl groups) may be substituted on the aromatic ring (e.g., phenol/novolak resin, cresol/novolak resin). Preferred novolak-type epoxy resins include glycidyl ethers of novolak resins which may be substituted with a $C_{1-2}$ alkyl group.

Examples of the aromatic amine component constituting an amine-series epoxy resin are monocyclic aromatic amines (e.g., aniline, toluidine), monocyclic aromatic diamines (e.g., diaminobenzene, xylylenediamine), monocyclic aromatic amino alcohols (e.g., aminohydroxybenzene), polycyclic aromatic diamines (e.g., diaminodiphenylmethane), and polycyclic aromatic amines.

The number average molecular weight of the epoxy resin is, for example, bout 200 to 50,000, preferably about 300 to 10,000, more preferably about 400 to 6,000 (e.g., about 400 to 5,000). Moreover, the number average molecular weight of the phenoxy resin is, for example, about 500 to 50,000, preferably 1,000 to 40,000, more preferably about 3,000 to 35,000.

The epoxy resin may be used in a cured state, and the curing is effected by the use of, e.g., an amine-series curing agent (e.g., ethylenediamine and other aliphatic amines; metaphenylenediamine, xylylenediamine, and other aromatic amines), a polyaminoamide-series curing agent, an acid or acid anhydride-based curing agent.

(6) Aromatic Polyether Resin

Although a polyarylene ether resin, particularly an ortho-, meta-, or paraphenylene ether resin, an ortho-, meta-, or paraxylylene ether resin can be employed as the aromatic polyether resin, of these, a homopolymer or copolymer having a structural unit represented by the following formula (12) is preferred:

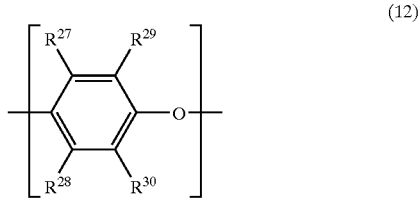

(12)

wherein $R^{27}$, $R^{28}$, $R^{29}$, and $R^{30}$ each individually represents an alkyl group having 1 to 6 carbon atoms, a hydroxyalkyl group, an aminoalkyl group, an aryl group, or hydrogen atom.

Of the substituents $R^{27}$ to $R^{30}$ in the formula (12), examples of the alkyl group are methyl group, ethyl group, propyl group, isopropyl group, n-butyl group, n-hexyl group, and other linear or branched $C_{1-10}$ alkyl groups. Examples of the hydroxyalkyl group are hydroxymethyl group, hydroxyethyl group, and other hydroxy $C_{1-4}$ alkyl groups. Examples of the aminoalkyl group are aminomethyl group, aminoethyl group, and other amino$C_{1-4}$alkyl groups. Examples of the aryl group are phenyl group and phenyl groups having a substituent.

Of the aromatic polyether resins, representatives of the homopolymer are poly(2,6-dimethyl-1,4-phenylene)ether, poly(2-methyl-6-ethyl-1,4-phenyene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-hydroxyethyl-1,4-phenylene)ether, poly(2,6-diphenyl-1,4-phenylene)ether, poly(2,5-dimethyl-1,4-phenylene)ether, poly(2,5-diethyl-1,4-phenylene)ether, poly(1,3-xylylene) ether, and poly(1,4-xylylene)ether. Of these, poly(2,6-dimethyl-1,4-phenylene)ether and poly(1,4-xylylene)ether are preferred from an economical viewpoint.

Of the aromatic polyether resins, examples of the copolymer are copolymers of 2,6-dimethylphenol with co-polymerizable monomers (e.g., at least one monomer selected from 2,3,6-trimethylphenol and o-cresol) or with styrenic monomers.

The aromatic polyether resins may be used either singly or in combination.

There is no particular restriction as to the number average molecular weight of the aromatic polyether resin, and it can be selected within the range of 300 to $5 \times 10^4$, preferably 400 to $1 \times 10^4$.

[Proportions of Phosphorus-Containing Compound and Aromatic Compound]

The amount of the phosphorus-containing compound is selected within such a range as to impart flame retardancy to the resulting resin, and it can be selected within the range of, per 100 parts by weight of the aromatic Ad compound, bout 1 to 500 parts by weight (e.g., 10 to 400 parts by weight), preferably about 1 to 300 parts by weight (e.g., 5 to 250 parts by weight), more preferably about 10 to 250 parts by weight (e.g., 20 to 250 parts by weight). Usually, the amount of the phosphorus compound is about 15 to 200 parts by weight (e.g., 20 to 200 parts by weight) per 100 parts by weight of the aromatic compound.

[Proportion of Flame Retardant]

According to the present invention, by using a phosphorus-containing compound in combination with a specific aromatic compound, even if its amount is small, it is made possible to impart high flame retardancy to a polyacetal resin having a low oxygen index. There is no particular restriction as to the proportion of the flame retardant provided that the properties of the resin are not adversely affected, and the proportion is, per 100 parts by weight of the polyacetal resin, about 1 to 100 parts by weight, preferably about 5 to 100 parts by weight, more preferably about 10 to 100 parts by weight (e.g., 15 to 90 parts by weight).

[Basic Nitrogen-Containing Compound]

The second characteristic of the present invention resides in that not only the flame retardancy and self-extinguishability but the flame retardancy of the polyacetal resin is multiplicatively improved and the stability is further enhanced by the combined use of the flame retardant and a basic nitrogen-containing compound.

The basic nitrogen-containing compound includes low-molecular weight compounds and macromolecular compounds (nitrogen-containing resin). The nitrogen-containing low-molecular weight compound may be monoethanolamine, diethanolamine, hexamethylenediamine, or any of other aliphatic amines, an alicyclic amine (e.g., piperidine, piperadine, and any of other alicyclic secondary amine or tertiary amine), an aromatic alkylamine (e.g., benzylamine, p-xylylenediamine, m-xylylenediamine), an amino acid, or a derivative of any of these, but the basic nitrogen-containing compound is preferred to be urea or its derivative, imidazolone or its derivative (e.g., benzoimidazolone), an amidine derivative, aminotriazine or its derivative, pyrrole or its derivative (indole, carbazole, porphyrin compounds), pyrimidine or its derivative, hydrazine or its derivative, pyrazole or its derivative (e.g., pyrazole, 3,5-dimethylpyrazole, 3-amino-5-methylpyrazole, 3-methyl-5-pyrazolone), triazole or its derivative (e.g., 1,2,4-triazole, 3-amino-1,2,4-triazole, 3-amino-5-phenyl-1,2,4-triazole, 1,3-bis(3-amino-1,2,4-triazol-5-yl)benzene, 1H-benzotriazole, a metal salt of 1H-benzotriazole, 1H-tolyltriazole), an amide-series compound (e.g., malonamide, isophthalic acid diamide, and other polycarboxylic acid amides, p-aminobenzamide, and amide-group containing resins), an urethane-series compound, an imide-series compound (e.g., succlnimlde, glutarimide, phthalimide, pyromellitic diimide, 3,3'4,4'-benzophenone tetracarboxylic acid dimide, and other polycarboxylic acid imides), or a sulfonamide-series compound (e.g., toluenesulfoneamide, toluenesulfonethylamide, and other sulfonic acid amides).

Incidentally, what the term "urea derivative" refers to include N-substituted ureas, N-substituted cyclic ureas, urea condensates, non-cyclic or cyclic ureido derivatives, and metal salts of cyclic ureidos. Moreover, "amidine derivative" is a general term for compounds having the structure $RC(NH_2) = NH$ (R is a substituent, such as an alkyl group), and what the term refers to includes non-cyclic amidines and non-melamine cyclic amidines.

(Urea and its Derivatives)

Examples of the urea derivative are N-substituted ureas [e.g., N—$C_{1-6}$alkylated ureas, N—$C_{6-20}$ arylated ureas, alkylene diureas (e.g., $C_{1-6}$alkylene diureas), arylene diureas (e.g., $C_{6-20}$arylene diureas)], N-substituted cyclic ureas [e.g., ethylene urea, propylene urea, acetylene urea, uric acid, and other $C_{2-6}$ cyclic ureas and their derivatives. For example, the acetylene urea derivative recited in Japanese Patent Application Laid-Open No. 98346/1987 (JP-62–98346A)], and urea condensates are exemplified. Further, urea derivatives include N-substituted ureas, methylolated N-substituted cyclic ureas, and alkoxymethylated N-substituted cyclic ureas. The urea condensate may be a non-cyclic one or a cyclic one, and either will do. The non-cyclic condensate includes dimers of urea (e.g., biuret, biurea), polymers of urea, and condensates of urea with aldehyde compounds. Examples of such condensates are condensates with $C_{1-6}$ aldehydes, such as a non-cyclic condensate (isobutylidene diurea) of urea with isobutylaldehyde, and a non-cyclic condensate of urea with formaldehyde (e.g., a non-cyclic condensate which may be constituted of one or a plurality of urea units, or it may be constituted of (n+1) urea units via n methylene chains (n is an integer of 1 or greater). These non-cyclic condensates may be used either singly or as a mixture of two ore more of these. This mixture is available from Mitsui Chemicals Inc. as formnitrogen (a mixture eof methylene diurea, dimethylene triurea, or trimethylene tetraurea). Moreover, the urea derivative may be a urea resin. The urea resin may be used either singly or in combination.

Preferred urea derivatives includes ureido derivatives (e.g., monoureido, diureido, and derivatives thereof). Moreover, the urea derivative includes non-cyclic ureidos and cyclic ureidos.

Examples of the non-cyclic ureidos are ureido-acids of $C_{2-6}$ dicarboxylic acids [e.g., the ureido-acid of oxalic acid (oxaluric acid), the ureido-acid of malonic acid (malonuric acid)], derivatives thereof (e.g., acid amides of ureido-acid), carboxylic acids having an ureido group [e.g., ureidoformic acid, ureidoacetic acid, and other ureido group-containing $C_{1-6}$ monocarboxylic acids, ureidosuccinic acid (carbamylaspartic acid), and other carbamide group-containing $C_{2-6}$ dicarboxylic acid], or carbamide group-containing acid amides thereof (allophanic acid anilide, allophanamide), and carbamide group-containing esters thereof (e.g., allophanates). Examples of the non-cyclic diureidos are diureidos of $C_{2-6}$ carboxylic acids [e.g., diureidos of acetic acid (allantoic acid).

Examples of the cyclic monoureido are cyclic condensates of urea with acetaldehyde (e.g., crotylidene diurea), hydantoin, allantoin, and derivatives of these.

The monoureido, diureido, or particularly cyclic ureido-derivative may form a metal salt, such as a salt with an alkaline metal (e.g., Li, Na, K), an alkaline earth metal (e.g., Mg, Ca, Sr, Ba), a metal element of the Group 1B of the Periodic Table of Elements (e.g., Cu, Ag), a metal element of the Group 2B of the Periodic Table of Elements (e.g., Zn), a metal element of the Group 3B of the Periodic Table of Elements (Al, Ga, In), a metal element of the Group 4B of the Periodic Table of Elements (e.g., Sn, Pb), a metal element of the Group 8 of the Periodic Table of Elements (e.g., Fe, Co, Ni, Pd, Pt), or with any of other monovalent to tetravalent metal elements.

Particularly preferred as the cyclic ureido derivative are hydantoin and its derivatives, and allantoin and its derivatives.

Japanese Patent Application Laid-Open No. 87028/1975 (JP-50-87028A), GB-996252, U.S. Pat. No. 2,579,436, U.S. Pat. No. 2,762,708 and "DICTIONARY OF ORGANIC COMPOUNDS Vol. 1, p60 (1965 EYRES & SPOTTISWOODE-PUBLISHERS-LTD)" refer to hydantoin derivatives and allantoin derivatives. Examples of the hydantoin derivative are those substituted with an alkyl group, a cycloalkyl group, an aryl group, or any of a variety of substituents (e.g., 5-methyl-, 5-ethyl-, 5,5-dimethyl-, 5-cyclohexyl-, 5-methylene-, 5,5-pentametylenespiro-, 5-phenyl-, 5-hydroxyphenyl-, 5-methyl-5-phenyl-, 5,5-diphenyl-, 1-methyl-, 3,3'-ethylenebis-5,5-dimethyl-, and other mono-, di-, or polysubsituted hydantoin derivatives). Moreover, reaction products of hydantoin or hydantoin derivatives with aldehyde compounds [e.g., hydantoin/formaldehyde adduct, 1-hydroxymethyl-5,5-dimethylhydantoin, alkoxymethylated ones thereof] are also included. As the allantoin derivative, any of those substituted with an alkyl group, a cycloalkyl group, an aryl group, or any of a variety of substituents (e.g., 1-methyl-, 3-methyl-, 3-ethyl-, 5-methyl-, 1,3-dimethyl-, 1,6-dimethyl-, 1,8-dimethyl-, 3,8-dimethyl-, 1,3,6-trimethyl-, 1,3,8-trimethyl-, and other mono-, di-, or tri-$C_{1-4}$alkyl-substituted allantoin derivatives, 5-phenyl-substituted allantoin derivatives and other aryl-substituted derivatives), metal salts thereof [e.g., alkaline metal salts, alkaline earth metal salts, salts with metals of the Groups 1B, 2B, 3B, 4B, and 8 of the Periodic Table of Elements], reaction products of allantoin with aldehyde compounds [e.g., allantoin/formaldehyde adduct, alcohol-modified products thereof (e.g., alkoxymethylated ones)], reaction products of allantoin with nitrogen-containing compounds (amino- or imino group-containing compounds) [e.g., compounds with 2-pyrrolidone-5-carboxylic acid salts (e.g., salts, molecular compounds (complexes)), compounds of allantoin with imidazole compounds (e.g., salts, molecular compounds (complexes)), reaction products of allantoin with basic amino acids], and organic acid salts may be employed. Concrete examples of metal salts of allantoin are allantoin dihydroxyaluminium and allantoin chlorohydroxyaluminium. Examples of reaction products with amino- or imino group-containing compounds are allantoinsodium-dlpyrrolidone carboxylates.

There is no specific restriction as to the steric structure of allantoin and its derivative, and it may be of the d-, l, or dl-type. Allantoin and its derivatives can be used either singly or in combination.

(Amidine Derivative)

The amidine derivative include amidines containing the structural unit RC(=NH)$NH_2$ (R stands for hydrogen atom, an alkyl group, or an acyl group) and derivatives thereof. The amidine derivatives may be non-cyclic ones or cyclic ones. Moreover, the amidine derivatives include guanidines (guanidine and its derivatives) in which the substituent represented by R is an amino group, and both non-cyclic ones and cyclic ones will do. Non-cyclic amidines include, for example, amidines and their derivatives (particularly, guanidines), and non-cyclic guanidines include, for example, glycocyamine, guanolin, creatine, dicyandiamide, diguanide, cyanoguanidine, and derivatives of these.

Preferred guanidines are cyclic guanidines. The cyclic guanidine need only contain, as a constitutional unit of the ring, —$R^1$NC(=NH)$NR^2$—($R^1$ and $R^2$ are the same or different, each representing hydrogen atom, methyl group, ethyl group, or any of other $C_{1-4}$ alkyl groups, or formyl group, acetyl group, propionyl group, or any of other $C_{1-4}$ acyl groups. Although there is no particular restriction as to the size of the ring, a 5- or 6-membered ring compound is preferred. In the formula, it is particularly preferred that $R^1$ and $R^2$ are hydrogen atoms.

Examples of preferred cyclic guanidines are, as 5-membered ring nitrogen-containing compounds, glycocyamidine and derivatives thereof (e.g., glycocyamidine, thioglycocyamidine, creatinine, 5-methylglycocyamidine, 5-aminoglycocyamidine, 5-ureidoglycocyamidine), oxalylguanidine and cyclic guanidines having a structure similar thereto (e.g., oxalylguanidine, 2,4-diiminoparabanic acid, 2,4,5-triiminoparabanic acid), and urazole at least either one of the two oxo groups (=O) has been substituted with go) an imino group (=NH) (e.g., iminourazole, iminothiourazole, guanadine). Examples of preferred 6-membered cyclic nitrogen-containing compounds are non-melamine-series compounds such as isocyanuric acid imide and its derivatives (e.g., isoammeride, isoammerine, and N-substituted ones thereof), malonylguanidine, tartronylguanidine, and other cyclic guanidines, derivatives thereof, mesoxalylguanidine, and other cyclic guanidines.

Cyclic guanidines include those derived from dicyandiamide, such as mellon, ammerine, ammeride, dicyandiamidine, and derivatives thereof.

Of these guanidines enumerated above, glycocyamidine and its derivatives are particularly preferred. Exemplified as the most preferred cyclic nitrogen-containing compound is a glycocyamidine (e.g., creatinine).

(Aminotriazine and Derivatives Thereof)

Exemplified as aminotriazine are guanamine, acetoguanamine, proplonoguanamine, butyloguanamine (butanoguanamine), caprynoguanamine, benzoguanamine, phenylacetoguanamine, chlorobenzoguanamine, pyridinoguanamine, cyclohexaneguanamine, acryloguanamine, succinodiguanamine, adipoguanamine, phthaloguanamine, 3,9-bis[2-(3,5-diamino-2,4,6-triazaphenyl)ethyl]-2,4,8,10-tetraoxaspiro[5,5]undecane [CTU guanamine], 3,9-bis[(3,5-diamino-2,4,6-triazaphenyl) methyl]-2,4,8,10-tetraoxaspiro[5,5]undecane, substituted guanamine compounds recited in Japanese Patent Application Laid-Open No. 154181/2000 (JP-2000-154181A), and other guanamines, and melamine and other polyaminotriazines. Examples of aminotriazine derivatives are polyaminotriazine derivatives such as methylolated ones (e.g., monomethylolmelamine, dimethylolmelamine, trimethylolmelamine, tetramethylolmelamine, pentamethylolmelamine, hexamethylolmelamine, dimethylolbenzoguanamine, and condensates thereof), alkoxymethylated ones (e.g., methylated methylolmelamine, ethylated methylolmelamine, butylated methylolmelamine). Analogues of aminotriazine are melam, melem, and mellon.

Salts of aminotriazines with cyanuric acid or its derivatives [e.g., melamine salt of cyanuric acid such as melamine cyanurate; melem salt, melam salt, mellon salt, and guanamine salt corresponding to melamine salt(e.g., guanamine cyanurate, acetoguanamine cyanurate, benzoguanamine cyanurate, succinoguanamine cyanurate, adipoguanamine cyanurate, phthaloguanamine cyanurate, CTU guanamine cyanurate, cyanurates of substituted guanamine compounds recited in Japanese Patent Application Laid-Open No. 63365/2000 (JP-2000-63365A)] are also usable.

(Pyrimidine or its Derivatives)

Examples of pyrimidine and its derivatives are uracil and its derivatives (e.g., uracil, uridine) and cytosine and its derivatives (e.g., cytosine, cytidine).

(Hydrazine or its Derivatives)

Exemplified as hydrazine and its derivatives are a variety of compounds having a hydrazino or hydrazono group, such as alkylhydrazines [e.g., ethylhydrazine and other $C_{1-10}$alkylhydrazines], arylhydrazines (e.g., benzylhydrazine, hydrazinobenzene, hydrazinotoluene, and other $C_{6-20}$arylhydrazines), triazinehydrazines (e.g., trihydrazinotriazine), hydrazinocarboxylic acids, hydrazides, semicarbazides, hydrazones, tetrazoles (e.g., phenyltetrazole), pyrazoles (e.g., 3-methyl-5-pyrazolone, 3,5-dimethylpyrazole).

Hydrazides include monocarboxylic acid hydrazides (e.g., acetic acid hydrazide, palmitic acid hydrazide, stearic acid hydrazide, ethyl carbazate, and other $C_{2-22}$ aliphatic monocarboxylic acid hydrazides, benzoic acid hydrazide, salicylic acid hydrazide, p-hydroxybenzoic acid hydrazide, 1-naphthoic acid hydrazide, nicotinic acid hydrazide, and other $C_{6-20}$aromatic carboxylic acid hydrazides), polycarboxylic acid hydrazides (e.g., oxalic acid, malonic acid, succinic acid, glutaric acid, adipic acid, pimelic acid, suberic acid, azelaic acid, sebacic acid, dodecanedioic acid, dimeric acid, tartaric acid, malic acid, iminodiacetic acid, citric acid, nitriloacetic acid, ethylenediaminetetraacetic acid, and other mono- and polyhydrazides of $C_{2-40}$ saturated aliphatic polycarboxylic acids and ester derivatives thereof (e.g., $C_{2-20}$ saturated aliphatic dicarboxylic acid dihydrazides), cyclohexanedicarboxylic acids, cyclohexanetricarboxylic acids, and othermono- and polyhydrazides of $C_{8-16}$ alicyclic polycarboxylic acids and ester derivatives thereof, maleic acid, itaconic acid, and other mono- and polyhydrazides of $C_{4-20}$ unsaturated polycarboxylic acids and ester derivatives thereof, phthalic acid, isophthalic acid, terephthalic acid, naphthalenedicarboxylic acids, biphenylenedicarboxylic acids, trimellitic acid, pyrromellitic acid, 1,4,5,8-naphthoic acid, pyridinedicarboxylic acids, and other mono- and polyhydrazides of $C_{7-16}$ aromatic polycarboxylic acids and ester derivatives thereof).

Examples of semicarbazides are N,N'-ethylene-bissemicarbazide, N,N'-tetramethylenebissemicarbazide, N,N'-hexamethylenebissemicarbazide and N,N'-xylylenebissemicarbazide.

Examples of hydrazones are phenylhydrazone and other aldehydehydrazones, acetonesemicarbazone, acetonehydrazone, adipic acid dihydrazidemonoacetonehydrazone, adipic acid dihydrazidediacetonehydrazone, benzophenonehydrazone, and other ketonehydrazones.

(Basic Nitrogen-containing Polymer Compound)

Examples of the basic nitrogen-containing polymer compound (nitrogen-containing resin) are polyethylene imine, polyvinylamine, polyallylamine, polyaminomethyl-styrene, polyaminoethylstyrene, amino resins formed through the reaction with formaldehyde (e.g., guanamine resin, melamine resin, guanidine resin, and other condensed resins, benzoguanamine-melamine resin, aromatic polyamine/ melamine resins, urea-melamine resin, urea-benzoguanamine resin, and other co-condensable resins), hydrazide-containing compounds [e.g., poly(meth)acrylic acid-series compounds recited in Japanese Patent Application Laid-Open No. 145529/1980 (JP-55-145529A) and Japanese Patent Application Laid-Open No. 105905/1981 (JP-56-105905A); trade name "APA" manufactured by Otsuka Chemical Co., Ltd.], amido group-containing resins, polyaminothioether, polyurethane, polyurea, poly-5-methylenehydantoin, and polypyrrole (e.g., oxidized polymers of pyrrole).

Examples of the amido group-containing resins are polyamide resins (e.g., nylon 3, nylon 4, nylon 6, nylon 66, nylon 11, nylon 12, nylon 4–6, nylon 6–10, nylon 6–11, nylon 6–12, nylon 6-66-610, nylon 6-66-610-12, and other homo- or copolymerized polyamides (aliphatic polyamides) and substituted polyamides having a methylol group or alkoxymethyl group), poly-β-alanine copolymer, polyesteramide, polyamideimide, poly(meth)acrylamide, poly-N-vinylacetoamide, poly-N-vinylpyrrolidone, poly-N-vinyllactam, and poly-γ-alkylglutamate.

Examples of the polyurethane are those formed through the reaction between a diisocyanate component [e.g., benzene diisocyanate, toluene diisocyanate, diphenylmethane diisocyanate, biphenylene diisocyanate, xylylene diisocyanate, naphthalene diisocyanate, hexamethylene diisocyanate, isophorone diisocyanate] and a diol component [e.g., ethylene glycol, 1,3-propanediol, 1,4-butanediol, and other glycols, poly(tetramethyleneoxide)glycol, and other polyetherdiols, polybutylene adipate, polycaprolactone, and polyesterdiols].

Examples of the polyurea are those formed through the reaction between a diisocyanate component [e.g., toluene diisocyanate, diphenylmethane diisocyanate, xylylene diisocyanate, naphthalene diisocyanate, hexamethylene diisocyanate, isophorone diisocyanate] and a diamine component [e.g., ethylenediamine, diethylenetriamine, butylenediamine, hexamethylenediamine, trimethylenediamine, xylylenediamine, toluenediamine, diaminodiphenylmethane, naphthalenediamine], and those formed through the reaction between these amines and urea.

Preferred nitrogen-containing compounds include urea and its derivatives, amidine derivatives, polyaminotriazines (e.g., melamine and its derivatives, guanamines), pyrimidine and its derivatives, hydrazine and its derivatives, nitrogen-containing resins (e.g., melamine resin and other amino resins, polyamide resin, polyacrylamide, and other amide group-containing resins, polyurethane, polyurea). Particularly preferred are melamine and its derivatives, guanamines, amino resins (e.g., melamine resin), crosslinked amino resins (e.g., crosslinked melamine resin), polyamide resin, polyurethane, and polyurea.

These nitrogen-containing compounds can be used either singly or in combination. The amount of nitrogen-containing compound to be used can be selected within the range of, per 100 parts by weight of the polyacetal resin, about 0.01 to 80 parts by weight (e.g., 0.01 to 40 parts by weight), preferably about 0.05 to 30 parts by weight, more preferably about 0.1 to 20 parts by weight (particularly, 0.1 to 15 parts by weight). Incidentally, when the nitrogen-containing compound is utilized for the stabilization of the polyacetal resin, the use of about 0.01 to 10 parts by weight (e.g., 0.01 to 8 parts by weight), preferably about 0.05 to 2.5 parts by weight, more preferably about 0.1 to 1.5 parts by weight (particularly, 0.1 to 1 part by weight) per 100 parts by weight of the polyacetal resin is sufficient.

[Additives]

The resin composition of the present invention may contains at least one member selected from a variety of additives such as drip inhibitors, antioxidants, heat stabilizers, and fillers, depending on the intended, use thereof.

[Drip Inhibitor]

Dripping of kindling material and a molten upon combustion is inhibited by the addition of a drip inhibitor. As the drip inhibitor, any of a variety of fluorine-containing resin can be employed, examples of which include tetrafluoroethylene, chlorotrifluoroethylene, vinylidene fluoride, hexafluoropropylene, perfluoroalkylvinylether, and other homo- or copolymers of fluorine-containing monomers; and copolymers of the fluorine-containing monomers with copolymerizable monomers such as ethylene, propylene, and (meth)acrylate. Examples of such fluorine-containing resins are polytetrafluoroethylene, polychlorotrifluoroethylene, polyvinylidene fluoride, and other homopolymers; tetrafluoroethylene-hexafluoropropylene copolymer, tetrafluoroethylene-perfluoroalkylvinylether copolymer, ethylene-tetrafluoroethylene copolymer, ethylene-chlorotrifluoroethylene copolymer, and other copolymers. These fluorine-containing resins can be used either singly or in combination.

The fluorine-containing resin can be used in the form of particles, and the mean particle size may for example be about 10 to 5,000 μm, preferably about 100 to 1,000 μm, more preferably about 200 to 700 μm.

The content of the drip inhibitor can be selected within the range of, per 100 parts by weight of the polyacetal resin, about 0.01 to 10 parts by weight, preferably about 0.1 to 5 parts by weight, more preferably about 0.1 to 3 parts by weight.

[Antioxidant]

Antioxidants include phenol- (e.g., hindered phenols), amine-, phosphorous-, sulfur-, hydroquinone-, and quinoline-series antioxidants.

The phenol-series antioxidants includes hindered phenols, such as 2,6-di-t-butyl-p-cresol, 1,3,5-trimethyl-2,4,6-tris(3,5-di-t-butyl-4-hydroxybenzyl)benzene, 2,2'-methylenebis (4-methyl-6-t-butylphenol), 4,4'-methylenebis(2,6-di-t-butylphenol), 4,4'-butylidenebis(3-methyl-6-t-butylphenol), 1,6-hexanediol-bis[3-(3,5-di-t-butyl-4-hydroxyphenyl) propionate] and other $C_{2-10}$alkylenediol-bis[3-(3,5-di-branched $C_{3-6}$alkyl-4-hydroxyphenyl)propionates], triethylene glycol-bis[3-(3-t-butyl-5-methyl-4-hydroxyphenyl9propionate] and other di- or trioxy$C_{2-4}$alkylenediol-bis[3-(3,5-di-branched $C_{3-6}$alkyl-4-hydroxyphenyl)propionates], glycer-intris[3-(3,5-di-t-butyl-4-hydroxyphenyl)propionate] and other $C_{3-8}$alkanetriol-bis [3-(3,5-di-branched $C_{3-6}$alkyl-4-hydroxyphenyl) propionates], pentaerythri-toltetrakis[3-(3,5-di-t-butyl-4-hydroxyphenyl)propionate] and other $C_{4-8}$alkanetetraoltetrakis[3-(3,5-di-blanched $C_{3-6}$alkyl-4-hydroxyphenyl)propionate], n-octadecyl-3-(4',5'-di-t-butylphenol)propionate, n-octadecyl-3-(4'-hydroxy-3',5'-di-t-butylphenol)propionate, stearyl-2-(3,5-di-t-butyl-4-hydroxyphenol)propionate, distearyl-3,5-di-t-butyl-4-hydroxybenzylphosphonate, 2-t-butyl-6-(3-t-butyl-5-methyl-2-hydroxybenzyl)-4-methylphenyl acrylate, N,N'-hexamethylenebis(3,5-di-t-butyl-4-hydroxy-hydrocinamide), 3,9-bis(2-[3-(3-t-butyl-4-hydroxy-5-methylphenyl)propionyloxy]-1,1-dimethylethyl)-2,4,8,10-tetraoxaspiro[5,5]undecane, 4,4'-thiobis(3-methyl-6-t-butylphenol), and 1,1,3-tris(2-methyl-4-hydroxy-5-t-butylphenol)butane.

The amine-series antioxidants include phenyl-1-naphthylamine, phenyl-2-naphthylamine, N,N'-diphenyl-1,4-phenylenediamine, and N-phenyl-N'-cyclohexyl-1,4-phenylenediamine.

The phosphorus-series antioxidants include triisodecyl phosphite, triphenyl phosphite, trisnonylphenyl phosphite, diphenylisodecyl phosphite, phenyldiisodecyl phosphite, 2,2-methylenebis(4,6-di-t-butylphenyl)octyl phosphite, 4,4'-butylidenebis(3-methyl-6-t-butylphenyl)ditridecyl phosphite, tris(2,4-di-t-butylphenyl)phosphite, tris(2-t-butyl-4-methylphenyl)phosphite, tris(2,4-di-t-amylphenyl) phosphite, tris(2-t-butylphenyl)phosphite, bis(2-t-butylphenyl)phenyl phosphate, tris[2-(1,1-dimethylpropyl)-phenyl]phosphite, tris[2,4-(1,1(-dimethylpropyl)-phenyl] phosphite, tris[2-cyclohexylphenyl)phosphite, tris(2-t-butyl-4-phenylphenyl)phosphite, and other phosphite compounds; triethylphosphine, tripropylphosphine, tributylphosphine, tricyclohexylphosphine, diphenylvinylphosphine, allyldiphenylphosphine, triphenylphosphine, methyl-phenyl-p-anisylphosphine, p-anisyldiphenylphosphine, p-tolyldiphenylphosphine, di-p-anisylphenylphosphine, di-p-tolylphenylphosphine, tri-m-aminophenylphosphine, tri-2,4-dimethylphenylphosphine, tri-2,4,6-trimethylphenylphosphine, tri-o-tolylphosphine, tri-m-tolylphosphine, tri-p-tolylphosphine, tri-o-anisylphosphine, tri-p-anisylphosphine, 1,4-bis(diphenylphosphino)butane, and other phosphinated compounds.

The hydroquinone-series antioxidants include 2,5-di-t-butylhydroquinone, and the quinoline-series antioxidants include 6-ethoxy-2,2,4-trimethyl-1,2-dihydroquinone. The sulfur-series antioxidants include dilaurylthiodipropionate, distearylthiodiprolonate, and others.

Preferred antioxidants include phenol-series antioxidants (particularly, hindered phenols), such as polyol-poly [(branched $C_{3-6}$alkyl or hydroxy group-substituted phenyl) propionate].

Antioxidants can be used either singly or in combination. The content of the antioxidant can be selected within the range of, per 100 parts by weight of the polyacetal resin, about 0.01 to 5 parts by weight, preferably about 0.01 to 2.5 parts by weight, particularly about 0.01 to 1 part by weight.

[Heat Stabilizer]

Heat stabilizers include hindered amine-series compounds. Examples of the hindered amine-series compounds are piperidine derivatives having a sterne hindrance group (e.g., 4-acetoxy-2,2,6,6-tetramethylpiperidine, 4-stearoyloxy-2,2,6,6-tetramethylpyperidine, 4-acryloyloxy-2,2,6,6-tetramethylpyperidine, 4-methoxy-2,2,6,6-tetramethylpyperidine, 4-benzoyloxy-2,2,6,6-tetramethylpyperidine, 4-cyclohexyloxy-2,2,6,6,-tetramethylpyperidine, 4-phenoxy-2,2,6,6-tetramethylpyperidine, 4-benzyloxy-2,2,6,6-tetramethylpyperidine, 4-(phenylcarbamoyloxy)-2,2,6,6-tetramethylpyperidine, bis(2,2,6,6-tetramethyl-4-pyperidyl)oxalate, bis(2,2,6,6,-tetramethyl-4-pyperidyl)malonate, bis (2,2,6,6-tetramethyl-4-pyperidyl)adipate, bis(2,2,6,6-tetramethyl-4-pyperidyl)sebacate, bis(1,2,2,6,6-pentamethyl-4-pyperidyl)sebacate, bis(2,2,6,6-tetramethyl-4-pyperidyl)terephthalate, 1,2-bis(2,2,6,6-tetramethyl-4-pyperidyloxy)ethane, bis(2,2,6,6-tetramethyl-4-pyperidyl) hexamethylene-1,6-dicarbamate, bis(1-methyl-2,2,6,6-tetramethyl-4-pyperidyl)benzene-1,3,5-tricarboxylate, and other 2,2,6,6,-tetramethylpyperidines) and polycondensates of pyperidine derivatives of high molecular weight (e.g., dimethyl succinate-1-(2-hydroxyethyl)-4-hydroxy-2,2,6,6-tetramethylpyperidine polycondensate).

Heat stabilizers can be used either singly or in combination.

The amount of the heat stabilizer to be added is, for example, about 0.01 to 5 parts by weight, preferably about 0.01 to 2.5 parts by weight, more preferably about 0.1 to 2 parts by weight (e.g., 0.1 to 1.5 parts by weight) per 100 parts by weight of the polyacetal resin.

[Filler]

The polyacetal resin composition of the present invention may contain a filler. Examples of the filler (reinforcing agent, strengthening agent) include particulate, fibrous, and plate-like ones. Examples of the particulate fillers are silica, powdered quartz, glass beads, powdered glass, calcium phosphate, sodium hydrogenphosphate, magnesium phosphate, aluminum phosphate, and other phosphates, calcium silicate, aluminum silicate, kaolin, clay, talc, and other silicates, alumina, zinc oxide, magnesium oxide, zirconium oxide, aluminum hydroxide, calcium carbonate, magnesium carbonate, barium sulfate, potassium titanate, molybdenum disulfate, carbon black, graphite, and metal powders. Examples of the fibrous fillers are high-melting point organic fibers (e.g., vinylon fiber, polyacrylonitrile fiber, polyamide fiber, aramid fiber), inorganic fibers (e.g., glass fiber, alumina fiber, silica/alumina fiber, zicornia fiber, carbon fiber, metal fiber), and whiskers (e.g., alumina, beryllium oxide, boron carbide, silicon carbide, boron nitride, silicon nitride, and other whiskers). Examples of the plate-like fillers include mica, glass flakes, metal foil, and others.

The fillers can be used either singly or in combination. The amount of the filler to be used can be selected within the range of, per 100 parts by weight, about 1 to 500 parts by weight, preferably about 5 to 250 parts by weight, more preferably about 10 to 100 parts by weight.

The drip inhibitors, antioxidants, heat stabilizers, and fillers listed above can be used either singly or in combination.

Incidentally, the use of such additive(s) (particularly, an antioxidant) in combination with the, basic nitrogen-containing compound not only significantly improves the heat stability, molding stability, and other properties but also prevents the generation of formaldehyde to a large extent, inhibiting the degradation of the shaped article.

[Other additives]

The flame retardant resin composition may comprise other flame retardants, examples of which are halogen-containing flame retardants, sulfur-containing flame retardants, silicon-containing flame retardants, alcohol-based flame-retardants, inorganic flame retardants [e.g., metal oxides, metal hydroxides, metal carbonates, zeolite, low-melting point glass (e.g., "Seaplea" C200 manufactured by Air Brown, Microfine)], and Intumerscent-series flame retardants (e.g., "Great lakes NH-1511" manufactured by Great Lakes Chemical, "STI-300" manufactured by Shikoku Corp.).

The halogen-containing flame retardants include chlorine-, bromine-, or iodine-containing organic flame retardants, such as halogenated diphenyl ether, ethylenebis (halogenated phthalimide), trihalogenated phthaliminoethyl borate, halogenated polycarbonate, halogenated epoxy compounds, halogenated styrene, halogenated polyphenylene oxide, and polyhalogenated benzyl (meth)acrylate.

Examples of the sulfur-containing flame retardants are, besides sulfates, melamine sulfate, melam sulfate, and melem sulfate, organic sulfonic acid, sulfamic acid, organic sulfamic acid, and their salts, esters, and amides.

The silicon-containing organic flame retardants include (poly)organosiloxanes. The (poly)organosiloxanes include dialkylsiloxanes (e.g., dimethylsiloxane), alkylarylsiloxanes (e.g., phenylmethylsiloxane), diarylsiloxanes, other monoorganosiloxanes, homopolymers thereof (e.g., polydimethylsiloxane, polyphenylmethylsiloxane), and copolymers. As the (poly)organosiloxane, a modified (poly) organosiloxane having such a substituent as epoxy, hydroxy, carboxyl, amino, or ether group at an end or in the main chain of the molecule (e.g., modified silicone).

Examples of the alcohol-based flame retardants are polyhydric alcohols, polyhydric alcohols of oligomers, esterified polyhydric alcohols, substituted alcohols, succarides (e.g., monosaccharides, polysaccharides), homo- or copolymers of vinyl alcohols (e.g., hydrolyzates of homo- or copolymers of aliphatic vinyl carboxylates (e.g., vinyl acetate).

Of the inorganic flame retardants, examples of the metal oxides are molybdenum oxide, tungstlc oxide, titanium oxide, zirconium oxide, tin oxide, copper oxide, zinc oxide, aluminum oxide, magnesium oxide, nickel oxide, iron oxide, manganese oxide, antimony trioxide, antimony tetraoxide, antimony pentaoxide, and antimonic acid soda. Examples of the metal hydroxides are aluminum hydroxide, magnesium hydroxide, tin hydroxide, and zirconium hydroxide. Examples of the metal carbonates are calcium carbonate, magnesium carbonate, and zinc carbonate. Particularly, the metal oxide and metal hydroxide are useful, for they function also as stabilizers of red phosphorus even in small amounts.

The inorganic flame retardants include metal sulfates (e.g., molybdenum disulfate, tungstic disulfate) and metal stannates (e.g., zinc stannate), metal borates (e.g., sodium borate, calcium borate (calcium boric anhydride, hydrous calcium borate), magnesium borate, barium borate, zinc borate [zinc borate anhydride and hydrous zinc borate (e.g., "Fire Brake" ZB, 415 or 500 manufactured by U.S.Borax)], manganese borate, strontium borate), polyacid salts [e.g., molybdates (e.g., ammonium molybdate, ammonium molybdate, potassium molybdate, calcium molybdate, zinc molybdate), tungstates (e.g., ammonium tungstate, potassium tungstate, calcium tungstate, zinc tungstate)], and swellable graphite.

The other flame retardants can be used either singly or in combination.

The content of the other flame retardant can be selected within the range of, for example, about 0.01 part by weight of 70 parts by weight, preferably about 0.1 to parts by weight per 100 parts by weight of the polyacetal resin.

If necessary, to the resin composition of the present invention may be added a variety of polymers [e.g., acrylic resins (polymethyl methacrylate and other homo- or copolymers of $C_{1-10}$ alkyl (meth)acrylates), ionomers, polyalkylene glycols, polyester resin, polyolefinlc resin, silicone resin, acrylic elastomers, urethane-series elastomers].

Further, to the resin composition may be added a colorant (e.g., dyes, inorganic and organic pigments), a weather (light) resistant stabilizer, a heat stabilizer, a mold releasing agent, a necleation agent, an antistatic agent, a surfactant, an electroconducting agent, a slip agent [e.g., silicone oil, silicone resin, fluororesin, polyolefinic resin, poly($C_{2-4}$alkylene glycols)], a fluorescent whitening agent, an inhibitor for inhibiting a phosphoric acid derivative from being formed from a phosphine [e.g., unsaturated bond-containing compounds (e.g., crotonaldehyde recited in Japanese Patent Application Laid-Open No. 208804/1993 (JP-5-208804A) and Japanese Patet Application Laid-Open No. 35667/1999 (JP-11-35667A), itaconic acid, itaconic anhydride, itaconanilic acid, ethylenebisitaconimide, maleic anhydride, phenylmaleimide, 2-butene-1,4-diol)], impact resistance improvers (e.g., core/shell polymers constituted of polyurethane or rubbery corepolymers and glassy shell polymers, particulate silicone elastomers, olefinic elastomer). Incidentally, the phosphines include all the phosphines enumerated in the paragraphs referring to the phosphorus-containing compounds, phosphine oxides, diphosphites (e.g., phosphinic acid), phosphinates, red phosphorus from which hydrogen phosphide, and oxidized derivatives thereof can be formed by hydrolusis, phosphine compounds enumerated in the paragraph referring to the oxidation inhibitor, and derivatives of these.

Particularly, the use of a heat stabilizer improves the heat stability of polyacetal. Exemplified as the heat stabilizer are alkaline or alkaline earth metal-containing compounds [particularly, organic carboxylic acid metal salts (calcium acetate, calcium citrate, magnesium stearate, calcium stearate, calcium 12-hydroxystearate), metal oxides (e.g., magnesium oxide, calcium oxide), metal hydroxides (e.g., magnesiumhydroxide, calciumhydroxide), metal carbonates], silicates (e.g., magnesium silicate, aluminum silicate), zeolite, and hydrotalcite.

Of these, alkaline or alkaline earth metal-containing compounds (particularly, magnesium compounds, calcium compounds, and other alkaline earth metal-containing compounds), zeolite, and hydrotalcite are preferred.

Although there is no particular restriction as to the zeolite, those other than zeolite of the H-type, such as zeolite recited in Japanese Patent Application Laid-Open No. 62142/1995 (JP-7-62142A [zeolites the smallest unit cell of which is a crystalline aluminosilicate with an alkaline and/or alkaline earth metal (A-, X-, Y-, L-, and ZSM-type zeolites, mordenite-type zeolite; chabazite, mordenite, faujasite, and other naturally-occurring zeolites)] can be employed.

Incidentally. A-type zeolite is available under the trade name "Zeolam A-3", "Zeolam A-4", or "Zeolam A-5", X-type zeolite under the trade name "Zeolam F-9", and Y-type zeolite under the trade name "HSZ-320NAA", from Tosoh Corp.

As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

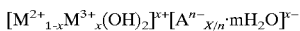

In the formula, $M^{2+}$ represents $Mg^{2+}$, $Mn^{2+}$, $Fe^{2+}$, $Co^{2+}$, or any of other divalent metal ions; $M^{3+}$, $Al^{3+}$, $Fe^{3+}$, $Cr^{3+}$, or any of other trivalent metal ions; $A^{n-}$ represents $CO_3^{2-}$, $OH^-$, $HPO_4^{2-}$, $SO_4^{2-}$, or any of other n-valent anions (particularly, monovalent or divalent anion); x is 0<x <0.5; and m is $0 \leq m < 1$.

Incidentally, the hydrotalcite is available from Kyowa Chemical Industry Co., Ltd. under the trade name "DHT-4A", "DHT-4A-2", or "Alcamizer".

The amount of the heat stabilizer to be used is, for example, about 0.01 to 20 parts by weight, preferably about 0.1 to 15 parts by weight (e.g., 1 to 10 parts by weight) per 100 parts by weight of the polyacetal resin.

[Production Process]

The polyacetal resin composition of the present invention may be a particulate mixture or a molten mixture, and it can be prepared by mixing a polyacetal resin, a phosphorus-containing compound, an aromatic compound, a basic nitrogen-containing compound and, if necessary, other additives in a conventional manner. For example, (1) a process comprising mixing all components together, kneading and extruding the resulting mixture using a uniaxial or biaxial extruder into pellets, and molding the pellets, (2) a process comprising once making pellets (master batch) different in composition, mixing (diluting) the pellets in a certain ratio, and molding the resulting pellets to give a shaped article having a certain composition, or (3) a process comprising applying a flame retardant to a pelletized polacetal resin by for example spraying, and molding the resulting pellets to give a shaped article having a certain composition is utilized. In the preparation of the master batch, a resin composition may be formed by preparing a master batch constituted of at least two of a polyacetal resin, a phosphorus-containing compound, an aromatic compound, and a basic nitrogen-containing compound (in particular, a master batch containing at least a resin component), and melt-mixing the master batch thus prepared with a polyacetal resin.

Moreover, in the preparation of a composition for use in a shaped article, mixing of a powdered polyacetal being the substrate (e.g., a powder obtained by grinding part or all of the polyacetal resin) with other components (e.g., a flame retardant, a basic nitrogen-containing component) followed melt-kneading improves the dispersion of the additives and therefore is advantageous.

The resin composition of the present invention is high in stability as well as flame retardancy or self-extiguishability and capable of preventing dripping or glowing effectively and of inhibiting the generation of formaldehyde upon oxidation or thermolysis of a polyacetal resin. Therefore, the resin composition of the present invention is useful in fabricating a variety of shaped articles by such a conventional method as injection molding, extrusion molding, compression molding, blow molding, vacuum molding, foam molding, rotation molding, and gas injection molding.

The shaped article of the present invention is favorably applied to a variety of uses requiring flame retardancy, such as mechanical parts (e.g., active parts, passive parts, electrical wires, cable parts) in the automobile and electric/electronic fields and parts and members in the construction/piping and daily needs (daily life) fields. Usually, the shaped article of the present invention can be utilized as an electric/electronic part, a mechanical device part, or an automobile part.

To be more concrete, examples of mechanical parts in the automobile field are knobs, levers, and other automotive parts, inner handles, fuel trunk openers, sheet belt backles, assistant wraps, various switches, knobs, levers, clips, speaker grilles, and other interior decoration parts, meters, connectors, sockets, sensors, and other electric system-related parts, audio equipment, car navigation equipment, and other in-vehicle electric/electronic parts, parts which make contact with metal typified by the carrier plate of a window regulator, door lock actuator parts, mirror parts, wiper motor system parts, and fuel system-related parts.

Examples of the mechanical parts in the electric/electronic fields are parts or members of devices constituted of polyacetal resin shaped articles [e.g., audio equipment typified by cassette tape recorders, video-related equipment typified by VTR (video tape recorders), 8-mm videocassette recorders, and video cameras, OA (office automation) equipment typified by copying machines, facsimile, word processors, and computers, toys which are actuated by motors, spring, etc., key boards attached to telephones, computers, etc.]. Concrete examples are chassis (substrates), gears, levers, cams, pulleys, and bearings. Furthermore, the shaped article of the present invention is applicable for use as optical and magnetic media parts (e.g., metal thin film-type magnetic tape cassettes, magnetic disc cartridges optical and magnetic disc cartriges) in which at least part is formed of polyacertal resin shaped article, in further detail, music metal tape cassettes, digital audio tape cassettes, 8-mm video tape cassettes, floppy disk cartridges, mini disk cartridges, etc.

Furthermore, the polyacetal resin shaped article of the present invention is favorable for use in a variety of living-related parts, such as in lighting equipment, fittings, construction/piping materials such as cocks, spray nozzles, spray bottles, aerosol containers, and other common containers.

INDUSTRIAL APPLICABILITY

According to the present invention, since a flame retardant constituted of a phosphorus-containing compound and the specific aromatic compound, and a basic nitrogen-containing compound are used in combination, it is made possible to give high flame retardancy and stability to a polyacetal resin. It is also possible to make, without adversely affecting its inherent characteristics, a polyacetal resin highly flame retardant and stabilized by adding a small amount of the flame retardant. The heat stability (or fusion stability upon molding) can be further improved by adding additives.

EXAMPLES

Hereinafter, the present invention will be described in further detail based on examples, but these should by no means be construed as defining the scope of the invention.

Examples 1 to 65 and Comparative Examples 1 to 42
(Preparation of Resin Composition)

The following components were mixed into a polyacetal resin in the proportions shown in Tables, and the resulting mixture was kneaded by a Labo Plastmill (manufactured by Toyo Seiki, K.K.) at 190° C. for 5 minutes to give a resin composition. The resin composition thus obtained was compression-molded to fabricate a shaped article for combustion testing (130×13×3 mm), and the flame retardancy of the test piece was evaluated.

(Flame Retardancy Evaluation)

The shaped article for flame retardancy testing was horizontally fixed to a stand with a clamp, and the unfixed-side end (free end) of the shaped article was held over a flame for 10 seconds from the bottom side and then parted therefrom. The time taken by the test piece to stop burning since having been parted from the flame was measured and the flame retardancy was evaluated by the following criteria.

A: self-extinguishable shaped article with a combustion time of 10 seconds or shorter B: self-extinguishable shaped article with a combustion time of 10 seconds or longer C: non-self-extinguishable shaped article burned to the clamped part.

Further, while the flame retardancy was evaluated, the dripping of the shaped article was observed. It was evaluated whether the dripping occured or not.

Moreover, while the flame retardancy was evaluated, the glowing was observed. The glowing was evaluated according to the following criteria.

A: self-extinguishable shaped article with a glowing time of 10 seconds or shorter.

B: self-extinguishable shaped article with a glowing time of 10 seconds or longer C: non-self-distinguishable shaped article burned to the clamped part with no glowing time observed (Heat Stability Evaluation): Examples 54 to 65 and Comparative Examples 41 to 42

A test shaped article similar to the shaped article for flame retardancy testing was heat-treated in a geer oven (120° C.) for 7 days, and whether the surface of the shaped article was cracked or not was visually examined and evaluated according to the following criteria.

◦: not cracked X: cracked

Examples 66 to 78 and Comparative Example 43
(Preparation of Resin Compositions)

Each component was mixed into a polyacetal resin in a proportion shown in Table 10. The resulting mixture was fed to a vent-equipped biaxial extruder having a diameter of 30 mm in the atmosphere of a nitrogen, and melt-mixed at a cylinder temperature of 190° C. to give pellets. The resin composition was injection-molded to fabricate a test shaped article, and its flame retardancy, heat stability, and tracking resistance were evaluated.
(Flame Retardancy Examination)
In accordance with UL94, the flame retardancy was evaluated using a test piece 1.6 mm in thick.
(Heat Stability Evaluation)
The test shaped article (130×13×1.6 mm) was heat-treated in a geer oven (120° C.) for 7 days, and whether it was cracked or not was visually examined and the heat stability was evaluated according to the following criteria.
  o: not cracked
  X: cracked
(Tracking Resistance Evaluation)
In accordance with IEC Publication 112 standards, the comparative tracking index (CTI) of a test shaped article (70×50×3 mm) was measured.
In Examples and Comparative Examples, the following polyacetal resins and flame retardants were employed.
Polyacetal Resin A]
  A-1: polyacetal copolymer (Duracon M90-44, manufactured by Polyplastics Co., Ltd.)
  A-2: polyacetal copolymer (Duracon M90, manufactured by Polyplastics, Co., Ltd.)
  A-3: polyacetal homopolymer (Derlin 500-P, manufactured by Du Pont)
  A-4: polyacetal copolymer (Duracon GM20: 20% glass fiber-filled material, manufactured by Polyplastics, Co., Ltd.)
  A-5: polyacetal copolymer (Duracon GB25: 25% glass beads-filled material, manufactured by Polyplastics Co., Ltd.)
[Phosphorus-containing Compound]
  B-1: red phosphorus (Nova Excel 140, manufactured by Rin Kagaku Kogyo Co., Ltd.)
  B-2: red phosphorus (Nova Excel F5, manufactured by Rin Kagaku Kogyo Co., Ltd.)
  B-3: red phosphorus master batch prepared from red phosphorus (B-1) and a low-density polyethylene (red phosphorus/low-density polyethylene=50/50 (weight ratio)) using a vent-equipped biaxial extruder
  B-4: red phosphorus master batch prepared from red phosphorus (B-1) and polyacetal resin (A-1) ((B-1)/(A-1)= 30/70 (weight ratio)) using a vent-equipped biaxial extruder
  B-5: red phosphorus master batch prepared from red phosphorus (B-1) and novolak resin (C-1) ((B-1)/(C-1)=50/50 (weight ratio)) using a flask equipped with a stirrer
  B-6: red phosphorus master batch prepared from red phosphorus (B-1) and nylon 6-66-610 (red phosphorus/nylon 6-66-610=50/50 (weight ratio)) using a vent-equipped biaxial extruder
  B-7: red phosphorus master batch prepared from red phosphorus (B-1) and polyurethane (Miractran P485, manufactured by Nippon Miractran Co., Ltd.; red phosphorus/polyurethane=50/50 (weight ratio)) using a vent-equipped biaxial extruder Phosphorus Master Batch
  B-8: ammonium polyphosphate (TERRAJU C60, manufactured by Chisso Corp.)
  B-9: guanidine phosphate
  B-10: condensed phosphate (PX200, manufactured by Daihachi Chemical Industry Co., Ltd.)
  B-11: dimelamine pentaerythritol bisphosphate
  B-12: ammonium polyphosphate (TERRAJU C80, manufactured by Chisso Corp.)
  B-13: aluminum salt of 2-carboxyethylmethyl phosphinate
To an aqueous solution in which 2-carboxyethylmethyl phosphinate was dissolved was added two thirds moles of aluminum hydroxide, and the resulting mixture was reacted at 80 to 90° C. for 48 hours.
  B-14: calcium salt of methyl phosphonate
To an aqueous solution in which methyl phosphonate was dissolved was added the same molar weight of calcium hydroxide, and the resulting mixture was reacted at 80 to 90° C. for 10 hours.
  B-15: ammonium polyphosphate (TERRAJU C70, manufactured by Chisso Corp.)
  B-16: ammonium polyphosphate (Hostaflam AP462, manufactured by Hoechst)
  B-17: ammonium polyphosphate (Sumisafe P, manufactured by Sumitomo Chemical Co. Ltd.)
[Aromatic Compound C]
  C-1: novolak resin (Tamanol 759, manufactured by Arakawa Chemical Industries, Ltd.)
  C-2: phenol aralkyl resin (Milex XL-LL, manufactured by Mitsui Chemicals, Inc.)
  C-3: polyvinylphenol (Maruka Lyncur S1P, manufactured by Maruzen Petrochemical Co., Ltd.)
  C-4: 4,4'-diaminodiphenylmethane
  C-5: 2-aminophenol
  C-6: bisphenol A
  C-7: 4,4'-bisphenol
  C-8: 1,3,5-tris[2-(4-hydroxyphenyl)propyl]benzene (Tris TC, manufactured by Mitsui Chemicals, Inc.)
  C-9 adduct of 2,6-naphthalenediol with 2 mol of ethylene oxide
  C-10: 4,4'-di(α,α-dimethylbenzyl)diphenylamine
  C-11: phenolmelamine novolak resin [novolak resin (C-1)/N-monomethylolmelamine=100/40 (parts by weight); phenol/melamine/formaldehyde condensate prepared from 1,000 parts by weight of water and 0.3 part by weight of oxalic acid; melamine-modified novolak resin]
  C-12: aniline resin [aniline/formaldehyde condensate prepared from aniline/formaldehyde=1/0.75 (molar ratio)]
  C-13: bisphenol A-based epoxy resin (Epikote 1004K, manufactured by Yuka Shell Epoxy K.K.)
  C-14: poly-2,6-dimethylphenylene oxide (manufactured by General Science Corporation)
  C-15: bisphenol A-based polycarbonate resin (classified powder: mean particle size 30 $\mu$m)
  C-16: poly(1,4-xylylene)ether
  C-17: highorthonovolak resin (Sumilite Resin HPN-X, manufactured by Sumitomo Durez Co., Ltd.)
  C-18: dimerless novolak resin (Sumilite Resin PR53647, manufactured by Sumitomo Durez Co., Ltd.)
  C-19: novolak resin (Sumilite Resin PR53195, Sumitomo Durez Co., Ltd.)
(Nitrogen-containing Compound)
  D-1: melamine
  D-2: melamine formaldehyde resin prepared from 1 mol of melamine and 1.2 mol of formaldehyde
  D-3: melem [manufactured by Nissan Chemical Industries, Ltd.]
  D-4: melamine cyanurate [MC610, manufactured by Nissan Chemical Industries, Ltd.]
  D-5: acetoguanamine
  D-6: CTU guanamine [manufactured by Ajinomoto Fine-Techno Co., Inc.]
  D-7: cyanoguanidine
  D-8: hydantoin
  D-9: allantoin [manufactured by Kawaken Fine Chemicals Co., Ltd.]
  D-10: allantoin dihydroxyaluminum [ALDA, manufactured by Kawaken Fine Chemicals Co., Ltd.]
  D-11: formnitrogen 2 mole powder [manufactured by Mitsui Chemicals, Inc.]

D-12: ethylene urea
D-13: acetylene urea
D-14: biurea
D-15: adipic acid dihydrazide [manufactured by Otsuka Chemical Co., Ltd.]
D-16: isophthalic acid dihydrazide [manufactured by Otsuka Chemical Co., Ltd.]
D-17: polyacrylic acid hydrazide [APA, manufactured by Otsuka Chemical Co., Ltd.]
D-18: benzotriazole
D-19: phthalimide
D-20: nylon-6-66-610
D-21: polyurea prepared from toluene 2,4-diisocyanate and 4,4'-diaminodiphenylmethane
D-22: polyurea prepared from toluene 2,4-diisocyanate and ethylenedlamine
D-23: polyurethane prepared from 4,4'-diphenylmethane diisocyanate and ethylene glycol
D-24: adipoguanamine
D-25: (D-6) heat-treated in the atmosphere of nitrogen at 200° C. for 1 hour
[Antioxidant]
E-1: triethylene glycol bis[3-(t-butyl-5-methyl-4-hydroxyphenyl)propionate][Irganox 245, manufactured by Cibo-Geigy Ltd.]
[Heat Stabilizer]
F-1: bis(2,2,6,6-tetramethyl-4-piperidyl)sebacate [Sanol LS-770, manufactured by Sankyo Co., Ltd.]
F-2: zeolite 3A (Zeolam A-3, manufactured by Tosoh Corp.)
F-3: zeolite 4A (Zeolam A-4, manufactured by Tosoh Corp.)
F-4: zeolite 5A (Zeolam A-5, manufactured by Tosoh Corp.)
F-5: zeolite 13X (Zeolam F-9, manufactured by Tosoh Corp.)
F-6: Y-type zeolite (HSZ-320NAA, manufactured by Tosoh Corp.)
F-7: hydrotalcite (DHT-4A, manufactured by Kyowa Chemical Industry Co., Ltd.)
F-8: hydrotalcite (DHT-4A-2, manufactured by Kyowa Chemical Industry Co., Ltd.)
F-9: hydrotalcite (Alcamizer, manufactured by Kyowa Chemical Industry Co., Ltd.)
F-10: magnesium hydroxide
F-11: magnesium oxide
F-12: 12-hydroxystearic acid calcium
[Drip Inhibitor]
G-1: polytetrafluoroethylene
[Other Additives]
H-1: zinc borate (Fire brake ZB, manufactured by U.S. Borax)
H-2: titanium oxide
H-3: copper oxide (II)
H-4: polyurethane (Miractran E375M, manufactured by Nippon Miractran. Co. Ltd.)
H-5: core-shell polymer (Staphyloid, manufactured by Takeda Chemical Industries, Ltd.)

The results are shown in Tables.

TABLE 1

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Polyacetal resin A | A-1 | A-1 | A-1 | A-1 | A-1 | A-1 | A-1 | A-1 | A-1 | A-1 | A-1 | A-1 | A-2 | A-2 |
| (parts by weight) | 100 | 100 | 100 | 100 | 100 | 100 | 100 | 100 | 100 | 100 | 100 | 100 | 100 | 100 |
| Phosphorus-containing compound B | B-1 | B-1 | B-1 | B-1 | B-2 | B-3 | B-4 | B-5 | B-6 | B-7 | B-1 | B-1 | B-2 | B-2 |
| (parts by weight) | 6 | 13 | 13 | 13 | 6 | 30 | 60 | 26 | 30 | 30 | 13 | 13 | 6 | 6 |
| Aromatic compound C | C-1 | C-1 | C-1 | C-1 | C-1 | C-1 | C-1 | — | C-1 | C-1 | C-2 | C-3 | C-4 | C-5 |
| (parts by weight) | 13 | 13 | 13 | 7 | 20 | 15 | 18 | | 15 | 15 | 13 | 13 | 13 | 13 |
| Nitrogen-containing compound D | D-1 | D-1 | D-1 | D-1 | D-1 | D-1 | D-1 | D-1 | D-1 | D-1 | D-1 | D-1 | D-1 | D-1 |
| (parts by weight) | 7 | 2 | 7 | 13 | 2 | 8 | 10 | 7 | 8 | 8 | 7 | 7 | 2 | 2 |
| Antioxidant E | — | — | — | — | — | — | — | — | — | — | — | — | E-1 | E-1 |
| (parts by weight) | | | | | | | | | | | | | 0.5 | 0.5 |
| Heat stabilizer F | — | — | — | — | — | — | — | — | — | — | — | — | — | — |
| (parts by weight) | | | | | | | | | | | | | | |
| Drip inhibitor G | — | — | — | — | — | — | — | — | — | — | — | — | — | — |
| (parts by weight) | | | | | | | | | | | | | | |
| Flame retardancy | A | A | A | A | A | A | A | A | A | A | A | A | A | A |
| Dripping | n* | n | n | n | n | n | n | n | n | n | n | n | n | n |
| Glowing | A | A | A | A | A | A | A | A | A | A | A | A | A | A |

*not dripped

TABLE 2

| | Example | | | | | | | | | |
|---|---|---|---|---|---|---|---|---|---|---|
| | 15 | 16 | 17 | 18 | 19 | 20 | 21 | 22 | 23 | 24 |
| Polyacetal resin A | A-2 | A-2 | A-2 | A-2 | A-2 | A-1 | A-1 | A-1 | A-1 | A-1 |
| (parts by weight) | 100 | 100 | 100 | 100 | 100 | 100 | 100 | 100 | 100 | 100 |
| Phosphorus-containing compound B | B-1 | B-1 | B-1 | B-1 | B-1 | B-1 | B-1 | B-1 | B-1 | B-1 |
| (parts by weight) | 13 | 13 | 13 | 13 | 13 | 13 | 13 | 13 | 13 | 13 |
| Aromatic compound C | C-6 | C-7 | C-8 | C-9 | C-10 | C-11 | C-12 | C-13 | C-14 | C-15 |
| (parts by weight) | 13 | 13 | 13 | 13 | 13 | 13 | 13 | 13 | 13 | 13 |

TABLE 2-continued

| | Example | | | | | | | | | |
|---|---|---|---|---|---|---|---|---|---|---|
| | 15 | 16 | 17 | 18 | 19 | 20 | 21 | 22 | 23 | 24 |
| Nitrogen-containing compound D (parts by weight) | D-1 7 | D-1 7 | D-1 7 | D-1 7 | D-1 7 | D-1 2 | D-1 2 | D-1 7 | D-1 7 | D-5 13 |
| Antioxidant E (parts by weight) | E-1 0.5 | E-1 0.5 | E-1 0.5 | E-1 0.5 | E-1 0.5 | — | — | — | — | — |
| Heat stabilizer F (parts by weight) | — | — | F-1 0.5 | F-1 0.5 | F-1 0.5 | — | — | — | — | — |
| Drip inhibitor G (parts by weight) | G-1 0.7 | G-1 0.7 | — | — | — | — | — | — | — | — |
| Flame retardancy | A | A | A | A | A | A | A | A | A | B |
| Dripping | n* | n | n | n | n | n | n | n | n | n |
| Glowing | A | A | A | A | A | A | A | A | A | A |

*not dripped

TABLE 3

| | Comparative Example | | | | | | | | | |
|---|---|---|---|---|---|---|---|---|---|---|
| | 1 | 2 | 3 | 4 | 5 | 6 | 7 | 5 | 9 | 10 |
| Polyacetal resin A (parts by weight) | A-1 100 | A-1 100 | A-1 100 | A-1 100 | A-1 100 | A-1 100 | A-1 100 | A-1 100 | A-1 100 | A-1 100 |
| Phosphorus-containing compound B (parts by weight) | — | B-1 13 | — | — | B-1 13 | B-2 6 | B-3 30 | B-4 60 | B-6 30 | B-7 30 |
| Aromatic compound C (parts by weight) | — | — | C-1 13 | — | — | — | — | — | — | — |
| Nitrogen-containing compound D (parts by weight) | — | — | — | D-1 7 | D-1 7 | — | — | — | — | — |
| Antioxidant E (parts by weight) | — | — | — | — | — | — | — | — | — | — |
| Heat stabilizer F (parts by weight) | — | — | — | — | — | — | — | — | — | — |
| Drip inhibitor G (parts by weight) | — | — | — | — | — | — | — | — | — | — |
| Flame retardancy | C | C | C | C | C | C | C | C | C | C |
| Dripping | d* | d | d | d | d | d | d | d | d | d |
| Glowing | C | C | C | C | C | C | C | C | C | C |

*dripped

TABLE 4

| | Example | | | | | | | | | | | | | |
|---|---|---|---|---|---|---|---|---|---|---|---|---|---|---|
| | 25 | 26 | 27 | 28 | 29 | 30 | 31 | 32 | 33 | 34 | 35 | 36 | 37 | 38 |
| Polyacetal resin A (parts by weight) | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 |
| Phosphorus-containing compound B (parts by weight) | B-1 13 | B-1 13 | B-1 13 | B-1 13 | B-1 13 | B-1 13 | B-1 13 | B-1 13 | B-1 13 | B-1 13 | B-1 13 | B-1 13 | B-1 13 | B-1 13 |
| Aromatic compound C (parts by weight) | C-1 13 | C-1 13 | C-1 13 | C-1 13 | C-1 13 | C-1 13 | C-1 13 | C-1 13 | C-1 13 | C-1 13 | C-1 13 | C-1 13 | C-1 13 | C-1 13 |
| Nitrogen-containing compound D (parts by weight) | D-2 13 | D-3 13 | D-4 13 | D-5 7 | D-6 7 | D-7 7 | D-8 7 | D-9 7 | D-10 7 | D-11 7 | D-11 7 | D-13 13 | D-14 7 | D-15 7 |
| Antioxidant E (parts by weight) | — | — | — | — | — | — | — | — | — | — | — | — | — | — |
| Heat stabilizer F (parts by weight) | — | — | — | — | — | — | — | — | — | — | — | — | — | — |
| Drip inhibitor G (parts by weight) | — | — | — | — | — | — | — | — | — | — | — | — | — | — |
| Flame retardancy | A | A | A | A | A | A | A | A | A | A | A | A | A | A |
| Dripping | n* | n | n | n | n | n | n | n | n | n | n | n | n | n |
| Glowing | A | A | A | A | A | A | A | A | A | A | A | A | A | A |

*not dripped

TABLE 5

|  | Example | | | | | | | |
|---|---|---|---|---|---|---|---|---|
|  | 39 | 40 | 41 | 42 | 43 | 44 | 45 | 46 |
| Polyacetal resin A (parts by weight) | A-1 100 | A-1 100 | A-1 100 | A-1 100 | A-1 100 | A-1 100 | A-1 100 | A-1 100 |
| Phosphorus-containing compound B (parts by weight) | B-1 13 | B-1 13 | B-1 13 | B-1 13 | B-1 13 | D-1 13 | B-1 13 | B-1 13 |
| Aromatic compound C (parts by weight) | C-1 13 | C-1 13 | C-2 13 | C-2 13 | C-1 13 | C-1 13 | C-1 13 | C-1 13 |
| Nitrogen-containing compound D (parts by weight) | D-16 7 | D-17 7 | D-18 13 | D-19 13 | D-20 13 | D-21 13 | D-22 13 | D-23 13 |
| Antioxidant E (parts by weight) | — | — | — | — | — | — | — | — |
| Heat stabilizer F (parts by weight) | — | — | — | — | — | — | — | — |
| Drip inhibitor G (parts by weight) | — | — | — | — | — | — | — | — |
| Flame retardancy | A | A | A | B | A | A | A | A |
| Dripping | n* | n | n | n | n | n | n | n |
| Glowing | A | A | A | A | A | A | A | A |

*not dripped

TABLE 6

|  | Comparative Example | | | | | | | | | | | | | | | | |
|---|---|---|---|---|---|---|---|---|---|---|---|---|---|---|---|---|---|
|  | 11 | 12 | 13 | 14 | 15 | 16 | 17 | 18 | 19 | 20 | 21 | 22 | 23 | 24 | 25 | 26 | 27 |
| Polyacetal resin A (pbw)* | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 |
| Phosphorus-containing compound B (pbw) | — | — | — | — | — | — | — | — | — | — | — | — | — | — | — | — | — |
| Aromatic compound C (pbw) | C-1 13 | C-1 13 | C-1 13 | C-1 13 | C-1 13 | C-1 13 | C-1 13 | C-1 13 | C-1 13 | C-1 13 | C-1 13 | C-1 13 | C-1 13 | C-1 13 | C-1 13 | C-1 13 | C-1 13 |
| Nitrogen-containing compound D (pbw) | D-2 13 | D-3 13 | D-4 13 | D-5 7 | D-7 7 | D-8 7 | D-9 7 | D-10 7 | D-11 7 | D-12 7 | D-15 7 | D-18 13 | D-19 13 | D-20 13 | D-21 13 | D-22 13 | D-23 13 |
| Antioxidant E (pbw) | — | — | — | — | — | — | — | — | — | — | — | — | — | — | — | — | — |
| Heat stabilizer F (pbw) | — | — | — | — | — | — | — | — | — | — | — | — | — | — | — | — | — |
| Drip inhibitor G (pbw) | — | — | — | — | — | — | — | — | — | — | — | — | — | — | — | — | — |
| Flame retardancy | C | C | C | C | C | C | C | C | C | C | C | C | C | C | C | C | C |
| Dripping | d** | d | d | d | d | d | d | d | d | d | d | d | d | d | d | d | d |
| Glowing | C | C | C | C | e | C | C | C | C | C | C | C | C | C | C | C | C |

*parts by weight
**dripped

TABLE 7

|  | Example | | | | | Comparative Example | | | | | | | | |
|---|---|---|---|---|---|---|---|---|---|---|---|---|---|---|
|  | 47 | 48 | 49 | 50 | 51 | 28 | 29 | 30 | 31 | 32 | 33 | 34 | 35 | 36 |
| Polyacetal resin A (parts by weight) | A-3 100 | A-3 100 | A-3 100 | A-4 100 | A-5 100 | A-3 100 | A-4 100 | A-5 100 | A-3 100 | A-4 100 | A-5 100 | A-3 100 | A-4 100 | A-5 100 |
| Phosphorus-containing compound B (parts by weight) | B-1 13 | B-1 13 | B-1 13 | B-1 10 | B-1 13 | — | — | — | B-1 13 | B-1 10 | B-1 10 | — | — | — |
| Aromatic compound C (parts by weight) | C-1 13 | C-2 13 | C-3 13 | C-1 10 | C-1 10 | — | — | — | — | — | — | C-1 13 | C-1 10 | C-1 10 |
| Nitrogen-containing compound D (parts by weight) | D-1 7 | D-1 7 | D-1 7 | D-1 6 | D-1 6 | — | — | — | D-1 7 | D-1 6 | D-1 6 | D-1 7 | D-1 6 | D-1 6 |
| Antioxidant E (parts by weight) | — | — | — | — | — | — | — | — | — | — | — | — | — | — |
| Heat stabilizer F (parts by weight) | — | — | — | — | — | — | — | — | — | — | — | — | — | — |

TABLE 7-continued

|  | Example | | | | | Comparative Example | | | | | | | | |
|---|---|---|---|---|---|---|---|---|---|---|---|---|---|---|
|  | 47 | 48 | 49 | 50 | 51 | 28 | 29 | 30 | 31 | 32 | 33 | 34 | 35 | 36 |
| Drip inhibitor G (parts by weight) | — | — | — | — | — | — | — | — | — | — | — | — | — | — |
| Flame retardancy | A | A | A | A | A | C | C | C | C | C | C | C | C | C |
| Dripping | n* | n | n | n | n | d** | d | d | d | d | d | d | d | d |
| Glowing | A | A | A | A | A | C | C | C | C | C | C | C | C | C |

*not dripped
**dripped

TABLE 8

|  | Example | | Comparative Example | | | |
|---|---|---|---|---|---|---|
|  | 52 | 53 | 37 | 38 | 39 | 40 |
| Polyacetal resin A (parts by weight) | A-1 100 | A-1 100 | A-1 100 | A-1 100 | A-1 100 | A-1 100 |
| Phosphorus-containing compound B (parts by weight) | B-8 30 | B-9 30 | B-8 30 | B-9 30 | B-8 30 | B-9 30 |
| Aromatic compound C (parts by weight) | C-1 15 | C-1 15 | — | — | — | — |
| Nitrogen-containing compound D (parts by weight) | D-1 10 | D-1 10 | — | — | D-1 10 | D-1 10 |
| Antioxidant E (parts by weight) | — | — | — | — | — | — |
| Heat stabilizer F (parts by weight) | — | — | — | — | — | — |
| Drip inhibiter G (parts by weight) | — | — | — | — | — | — |
| Flame retardancy | A | A | B | B | B | B |
| Dripping | n* | n | n | n | n | n |
| Glowing | A | A | B | B | B | B |

*not dripped

TABLE 9

|  | Example | | | | | | | | | | | | Comp. Ex. | |
|---|---|---|---|---|---|---|---|---|---|---|---|---|---|---|
|  | 54 | 55 | 56 | 57 | 58 | 59 | 60 | 61 | 62 | 63 | 64 | 65 | 41 | 42 |
| Polyacetal resin A (pbw)* | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 |
| Phosphorus-containing compound B (pbw) | B-1 13 | B-1 B-10 10 3 | B-1 B-11 10 3 | B-2 B-12 7 10 | B-1 B-13 7 10 | B-2 B-14 7 10 | B-12 30 | B-15 30 | B-16 30 | B-17 30 | B-12 30 | B-12 30 | B-1 13 | B-12 30 |
| Aromatic compound C (pbw) | C-16 13 | C-17 13 | C-18 13 | C-18 13 | C-1 13 | C-2 15 | C-3 15 | C-17 15 | C-18 15 | C-19 15 | C-1 13 | C-1 13 | — | — |
| Nitrogen-containing compound D (pbw) | D-24 7 | D-6 7 | D-6 7 | D-25 7 | D-25 7 | D-25 7 | D-25 7 | D-25 7 | D-25 7 | D-25 7 | D-25 7 | D-25 7 | — | — |
| Antioxidant E (pbw) | — | — | — | — | — | — | — | — | — | — | — | — | — | — |
| Heat stabilizer F (pbw) | F-2 4 | F-3 7 | F-4 7 | F-5 7 | F-3 7 | F-6 7 | F-7 7 | F-8 7 | F-9 7 | F-10 4 | F-11 4 | F-12 4 | — | — |
| Drip inhibitor G (pbw) | — | — | — | — | — | — | — | — | — | — | — | — | — | — |
| Flame retardancy | A | A | A | A | A | A | A | A | A | A | A | A | C | B |
| Dripping | n | n | n | n | n | n | n | n | n | n | n | n | d*** | n |
| Glowing | A | A | A | A | A | A | A | A | A | A | A | A | C | B |
| Heat stability | ○ | ○ | ○ | ○ | ○ | ○ | ○ | ○ | ○ | ○ | ○ | ○ | X | X |

*parts by weight
**not dripped
***dripped

TABLE 10

|  | Example |  |  |  |  |  |  |  |  |  |  |  |  | Comp. Ex. |
| --- | --- | --- | --- | --- | --- | --- | --- | --- | --- | --- | --- | --- | --- | --- |
|  | 66 | 67 | 68 | 69 | 70 | 71 | 72 | 73 | 74 | 75 | 76 | 77 | 78 | 43 |
| Polyacetal resin A | A-1 | A-2 | A-1 | A-1 | A-1 | A-1 | A-1 | A-1 | A-1 | A-1 | A-1 | A-1 | A-1 | A-1 |
| (parts by weight) | 100 | 100 | 100 | 100 | 100 | 100 | 100 | 100 | 100 | 100 | 100 | 100 | 100 | 100 |
| Phosphorus-containing compounds | B-1 | B-2 | B-1 | B-1 | B-1 | B-1 | B-4 | B-4 | B-1 | B-1 | B-1 | B-1 | B-1 | B-1 |
| (parts by weight) | 13 | 10 | 13 | 13 | 13 | 13 | 60 | 60 | 10 | 13 | 13 | 13 | 13 | 13 |
| Aromatic compound C | C-1 | C-2 | C-11 | C-17 | C-18 | C-19 | C-19 | C-19 | C-19 | C-18 | C-19 | C-19 | C-19 | — |
| (parts by weight) | 13 | 13 | 13 | 13 | 13 | 13 | 20 | 20 | 13 | 13 | 13 | 13 | 13 |  |
| Nitrogen-containing compound D | D-1 | D-6 | D-25 | D-25 | D-25 | D-25 | D-25 | D-25 | D-25 | D-25 | D-25 | D-25 | D-25 | — |
| (parts by weight) | 7 | 7 | 7 | 7 | 7 | 7 | 10 | 10 | 7 | 7 | 7 | 7 | 7 |  |
| Antioxidant E | — | E-1 | — | — | — | — | — | — | — | — | — | — | — | — |
| (parts by weight) |  | 0.5 |  |  |  |  |  |  |  |  |  |  |  |  |
| Heat stabilizer F | F-2 | F-3 | F-7 | F-10 | F-11 | F-12 | F-3 | F-7 | F-3 | F-3 | F-3 | F-7 | F-8 | — |
| (parts by weight) | 7 | 7 | 7 | 4 | 4 | 4 | 10 | 10 | 7 | 7 | 7 | 7 | 7 |  |
| Drip inhibitor G | — | G-1 | — | — | — | — | — | — | — | — | — | — | — | — |
| (parts by weight) |  | 0.7 |  |  |  |  |  |  |  |  |  |  |  |  |
| other additives H | — | — | — | — | — | — | — | — | H-1 | H-2 | H-3 | H-4 | H-5 | — |
| (parts by weight) |  |  |  |  |  |  |  |  | 3 | 1 | 1 | 7 | 7 |  |
| UL94 flammability (1.6 mmt) | V-0 | V-0 | V-0 | V-0 | V-0 | V-0 | V-0 | V-0 | V-0 | V-0 | V-0 | V-0 | V-0 | HB or less |
| Heat stability | ○ | ○ | ○ | ○ | ○ | ○ | ○ | ○ | ○ | ○ | ○ | ○ | ○ | X |
| Tracking resistance (V) | >600 | >600 | >600 | >600 | >600 | >600 | >600 | >600 | >600 | >600 | >600 | >600 | >600 | >600 |

As apparent from Tables, the resin compositions of Examples are, as compared to those in Comparative Examples, high in flammability and do not suffer dripping nor glowing. Addition of a heat stabilizer prevents its heat resistance from deteriorating and imparts the resulting product excellent tracking resistance.

What is claimed is:

1. A polyacetal resin composition comprising a polyacetal resin, a flame retardant, and a basic nitrogen-containing compound, wherein the flame retardant comprises a phosphorus-containing compound and an aromatic compound which accelerates flame retardation in association with the phosphorus-containing compound, wherein the proportion of the phosphorus-containing compound is 1 to 500 parts by weight per 100 parts by weight of the aromatic compound, and the total amount of the phosphorus-containing compound and the aromatic compound is 1 to 100 parts by weight, and wherein the proportion of the nitrogen-containing compound is 0.01 to 80 parts by weight per 100 parts by weight of the polyacetal resin.

2. A polyacetal resin composition according to claim 1, wherein the phosphorus-containing compound is at least one member selected from the group consisting of red phosphorus, an organic phosphonate, an organic phosphinate, a (poly)phosphate, and a phosphoric acid ester.

3. A polyacetal resin composition according to claim 1, wherein the phosphorus-containing compound is at least one member selected from the group consisting of a stabilized red phosphorus, an organic phosphonic acid metal salt, an organic phosphinic acid metal salt, ammonium polyphosphate, and a condensed phosphate.

4. A polyacetal resin composition according to claim 1, wherein the phosphorus-containing compound comprises a stabilized red phosphorus and a thermoplastic resin.

5. A polyacetal resin composition according to claim 4, wherein the thermoplastic resin is at least one member selected from the group consisting of an olefinic resin, a polyurethane resin, and a polyamide resin.

6. A polyacetal resin composition according to claim 1, wherein the aromatic compound is a compound having a hydrocarbon ring reactive to formaldehyde, or a derivative thereof.

7. A polyacetal resin composition according to claim 1, wherein the aromatic compound is a compound having at least one member selected from the group consisting of a phenolic hydroxyl group and a phenolic amino group, or its derivative.

8. A polyacetal resin composition according to claim 1, wherein the aromatic compound is at least one aromatic ring-containing resin selected from the group consisting of a resin having an aromatic ring containing at least one group selected from a hydroxyl group and an amino group, an aromatic nylon resin, a polycarbonate resin, a polyarylate resin, an aromatic epoxy resin, and an aromatic polyether resin.

9. A polyacetal resin composition according to claim 8, wherein the resin having an aromatic ring containing at least one group selected from a hydroxyl group and an amino group is at least one member selected from the group consisting of a phenolic aralkyl resin, a phenolic novolak resin, an aromatic vinyl resin, a phenol melamine novolak resin, and an aniline resin.

10. A polyacetal resin composition according to claim 1, wherein the basic nitrogen-containing compound is at least one member selected from urea or its derivative, an amidine derivative, aminotriazine or its derivative, pyrimidine or its derivative, hydrazine or its derivative, an amide compound, and a urethane compound.

11. A polyacetal resin composition according to claim 1, which comprises a polyacetal resin, at least one phosphorus-containing compound selected from a particulate stabilized red phosphorus and ammonium polyphosphate, an aromatic ring-containing resin containing, in its repeating unit, a benzene ring or a bisphenol unit, and a basic nitrogen-containing compound, wherein the proportion of the phosphorus-containing compound is 10 to 400 parts by weight per 100 parts by weight of the aromatic ring-containing resin, the total amount of the phosphorus-containing compound and the aromatic ring-containing resin is 5 to 100 parts by weight per 100 parts by weight of the polyacetal resin, and the proportion of the basic nitrogen-containing compound is 0.05 to 50 parts by weight per 100 parts by weight of the polyacetal resin.

12. A polyacetal resin composition according to claim 1, which further comprises at least one member selected from the group consisting of a dripping inhibitor, an oxidation inhibitor, a heat stabilizer, a filler, an inorganic flame retardant, and an impact resistance improver.

13. A process for producing a flame-retardant polyacetal resin composition by mixing a polyacetal resin, a flame retardant claimed in claim 1, and a basic nitrogen-containing compound, wherein the proportion of the nitrogen-containing compound is 0.01 to 80 parts by weight per 100 parts by weight of the polyacetal resin.

14. A process according to claim 13, which comprises melt-mixing a master batch constituted of at least two components selected from a polyacetal resin, a phosphorus-containing compound, an aromatic compound, and a basic nitrogen-containing compound, with a polyacetal resin.

15. A shaped article made from a polyacetal resin composition claimed in claim 1.

16. A shaped article according to claim 15, which is an electric/electronic device part a mechanical device part, or an automobile part.

17. A polyacetal resin composition comprising a polyacetal resin, a flame retardant, and a basic nitrogen-containing compound, wherein the flame retardant comprises a phosphorus-containing compound and an aromatic compound which accelerates flame retardation in association with the phosphorus-containing compound, wherein the aromatic compound is a compound having at least one member selected from the group consisting of a phenolic hydroxyl group and a phenolic amino group, or is at least one aromatic ring-containing resin selected from the group consisting of (i) a resin having an aromatic ring containing at least one group selected from a hydroxyl group and an amino group, (ii) an aromatic nylon resin, (iii) a polyarylate resin, (iv) an aromatic epoxy resin, and (v) an aromatic polyether resin, and wherein the proportion of the phosphorus-containing compound is 1 to 500 parts by weight per 100 parts by weight of the aromatic compound, and the total amount of the phosphorus-containing compound and the aromatic compound is 1 to 100 parts by weight per 100 parts by weight of the polyacetal resin.

18. A polyacetal resin composition according to claim 17, wherein the resin having an aromatic ring containing at least one group selected from a hydroxyl group and an amino group is at least one member selected from the group consisting of a phenolic aralkyl resin, a phenolic novolak resin, an aromatic vinyl resin, a phenol melamine novolak resin, and an aniline resin.

19. A polyacetal resin composition according to claim 17, wherein the proportion of the nitrogen-containing compound is 0.01 to 80 parts by weight per 100 parts by weight of the polyacetal resin.

* * * * *